March 25, 1952 E. C. BUNNELL 2,590,153

AUTOMATIC GUN CHARGER

Filed June 24, 1947 12 Sheets-Sheet 1

INVENTOR.

Earl C. Bunnell.

BY Thiess, Olson & Mecklenburger.

Attys.

March 25, 1952 E. C. BUNNELL 2,590,153

AUTOMATIC GUN CHARGER

Filed June 24, 1947 12 Sheets-Sheet 2

INVENTOR.
Earl C. Bunnell
BY
Thiess, Olson & Mecklenburger
Attys.

March 25, 1952 — E. C. BUNNELL — 2,590,153

AUTOMATIC GUN CHARGER

Filed June 24, 1947 — 12 Sheets-Sheet 3

INVENTOR.
Earl C. Bunnell
BY
Thiess, Olson & Mecklenburger
Att'ys.

March 25, 1952 E. C. BUNNELL 2,590,153

AUTOMATIC GUN CHARGER

Filed June 24, 1947 12 Sheets-Sheet 4

INVENTOR.

Earl C. Bunnell

BY

Thiess, Olson & Mecklenburger.

Attys.

March 25, 1952 E. C. BUNNELL 2,590,153

AUTOMATIC GUN CHARGER

Filed June 24, 1947 12 Sheets-Sheet 5

INVENTOR.
Earl C. Bunnell
BY
Thiess, Olson & Mecklenburger
Attys.

March 25, 1952 E. C. BUNNELL 2,590,153

AUTOMATIC GUN CHARGER

Filed June 24, 1947 12 Sheets-Sheet 6

INVENTOR.

Earl C. Bunnell

BY

Thiess, Olson & Mecklenburger.

Attys.

March 25, 1952

E. C. BUNNELL 2,590,153

AUTOMATIC GUN CHARGER

Filed June 24, 1947

12 Sheets-Sheet 7

INVENTOR.
Earl C. Bunnell.
BY
Thiess, Olson & Mecklenburger
Attys.

INVENTOR.
Earl C. Bunnell
BY
Thiess, Olson & Mecklenburger.
Attys.

March 25, 1952 E. C. BUNNELL 2,590,153

AUTOMATIC GUN CHARGER

Filed June 24, 1947 12 Sheets-Sheet 9

INVENTOR.
Earl C. Bunnell
BY
Thiess, Olson & Mecklenburger
Attys.

March 25, 1952 E. C. BUNNELL 2,590,153

AUTOMATIC GUN CHARGER

Filed June 24, 1947 12 Sheets-Sheet 10

INVENTOR.
Earl C. Bunnell
BY
Thiess, Olson & Mecklenburger.
Attys.

March 25, 1952 E. C. BUNNELL 2,590,153

AUTOMATIC GUN CHARGER

Filed June 24, 1947 12 Sheets-Sheet 11

INVENTOR.
Earl C. Bunnell.
BY
Thiess, Olson & Mecklenburger.
Attys.

INVENTOR.
Earl C. Bunnell
BY
Thiess, Olson & Mecklenburger
Attys.

Patented Mar. 25, 1952 2,590,153

UNITED STATES PATENT OFFICE 2,590,153

AUTOMATIC GUN CHARGER

Earl C. Bunnell, Stratford, Conn., assignor to The Autoyre Company, Incorporated, Oakville, Conn., a corporation of Connecticut Application June 24, 1947, Serial No. 756,743

8 Claims. (Cl. 89—1)

This invention relates to automatic guns, commonly known as machine guns, for firing projectiles, and more particularly to guns of that class adapted, after once being set into operation, to continue to fire automatically as long as the trigger is held in released position.

In certain types of guns similar to that of the present invention, the parts have been so arranged that a substantial delay occurred between the pressing of the trigger-release button and the firing of the first round. In later types of armament for aircraft, the trend has been toward remotely controlled firing of a single gun or a group thereof, whereby by means not pertinent here, several guns on a single aircraft may be trained upon and are adapted to follow a single target. In connection with arrangements of this kind, automatic means have been provided whereby the gun, when traversing a course which will carry the projectiles past a part of the aircraft, is made to cease firing and to recommence firing after the line of fire has passed to a position where damage to the plane may not occur. Under these circumstances it is highly important that a minimum lag exist between the time the automatic cutoff is itself actuated and the time when the gun responds. When consideration is taken of the speed of the aircraft in straight flight and maneuvers, the rapidity with which the remotely controlled guns must follow an opposing aircraft, and the high rate of firing, it will be apparent that the lag aforesaid must be at an irreducible minimum.

Accordingly, one principal object of my invention is the provision of means whereby the gun is fired from a closed bolt position as contrasted with prior guns wherein firing is commenced with the bolt in open position. Thus the time lag between pressing of the trigger-release button and exit of the first round from the muzzle is reduced to a negligible degree and thereby the gun is better adapted to synchronized fire as one of a plurality of guns—for example, in aircraft, having automatic means controlling a plurality of guns trained on a common target.

Aircraft armament is generally located at positions remote from the operator, control of the trigger being through a contact closer and electric circuit, by a Bowden wire, or equivalent means. Such remotely positioned guns are generally charged, either initially or, in the event of a misfire or jam, during firing, by pneumatic mechanism associated with the breechblock to retract the bolt for feeding and chambering of a round. It is highly desirable that the time elapsed between charging and the beginning of firing be an absolute minimum, and for the reasons heretofore outlined.

Still another object is to provide timing valve means and quick-release valve means associated with the gun charging mechanism so arranged as to result in minimum delay between pneumatic charging of the gun and initiation of firing.

A further object is to provide a mechanism for feeding the belt of ammunition to the gun, such mechanism including a spring which is loaded by the force of the gases of explosion and which actuates the feeder by release of the spring loading, thereby preventing jamming which may otherwise occur with a positively operated feeding means. Thus variable pressure of the gases of explosion are not relied upon to actuate the feeder, but such variations are immaterial in loading the spring.

Another object is the provision of means operated by gases of explosion for operating mechanism which unlocks the breechblock slides from closed bolt position to permit return of the slides and bolt to open-bolt position by blowback, which mechanism, being timed by the firing of a preceding cartridge, is more advantageously synchronized with the maximum effect of blowback action of the round.

In carrying out my invention in one form I provide a gun-charging cylinder in which a piston is adapted to slide, the piston being engageable with a projection on one of the breechblock slides, so that upon admission of air against the piston, the pair of breechblock slides and the bolt are retracted to "open" position, and a round may be fed to the receiver and subsequently chambered upon release of the bolt by exhaust of the air from the cylinder. Such exhaust is arranged to occur directly to atmosphere by suitable valve means in order that the body of expressed air is not constrained to return through the air supply tubing and cock therefor. Air delivered to the charging cylinder actuates a piston which loads a spring operating the feeding mechanism, and also passes through a timing valve to the charging cylinder, the actuation of the feeding piston preparing the timing valve so that it may be closed by pressure of the air delivered to the charging cylinder, and the gun is thereby held in charged position.

According to one aspect of my invention, the feeder-operating spring is, during automatic fire, loaded by gases of explosion of a round impinging on a piston to feed the next round, the pneumatic loading action and the gas-operated action being usable alternatively as pointed out. In another aspect my invention utilizes the same gases of explosion to actuate a breechblock slide unlocking mechanism, there being a cylinder and plunger whereby the gas pressure may thrust push rods against the locked breechblock slides to unlock the same and permit the slides and bolt to be returned to open-bolt position by blowback of the round just fired.

Figures 3A, 3B, 4:
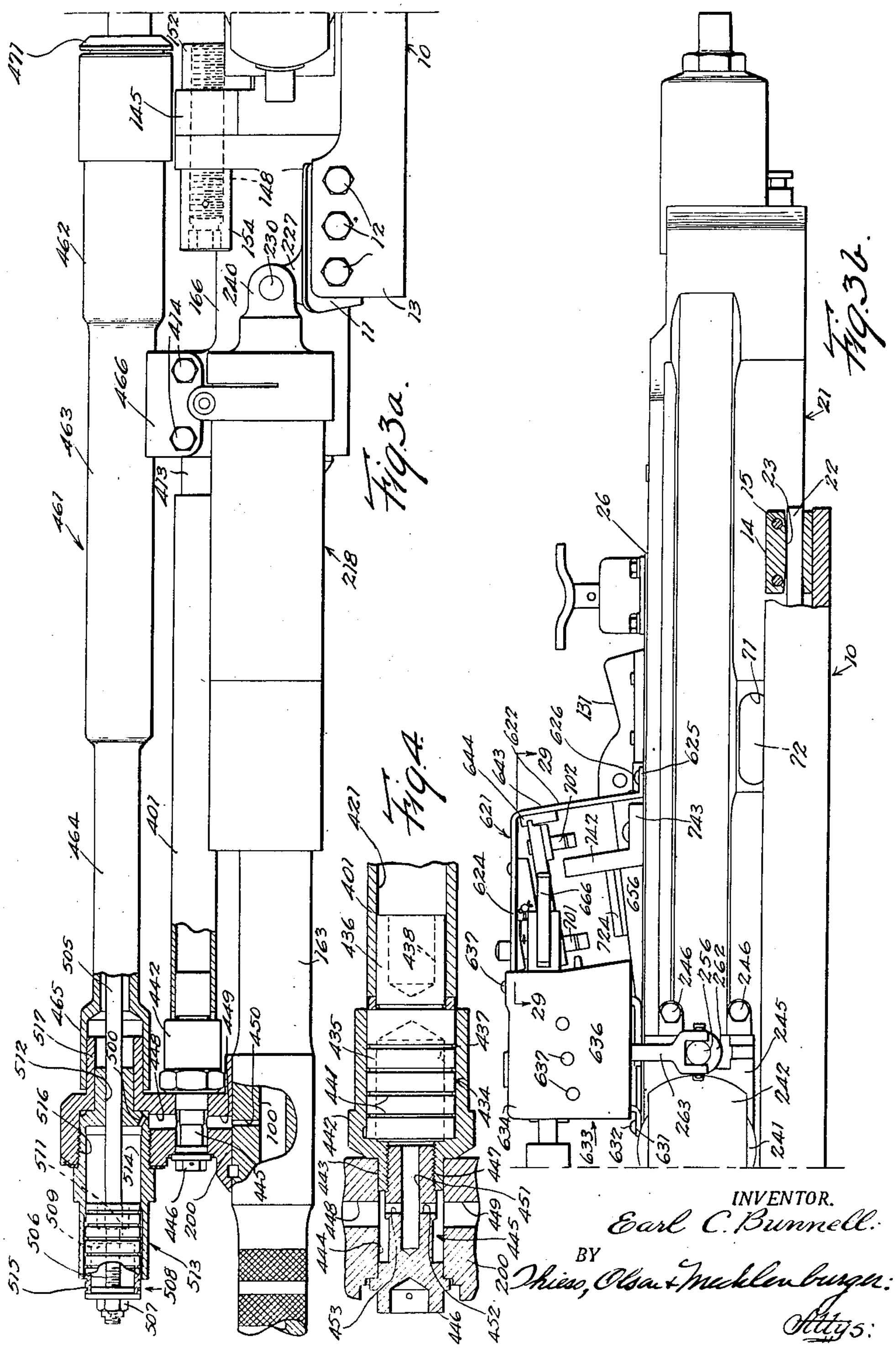
Figures 5A, 5B:
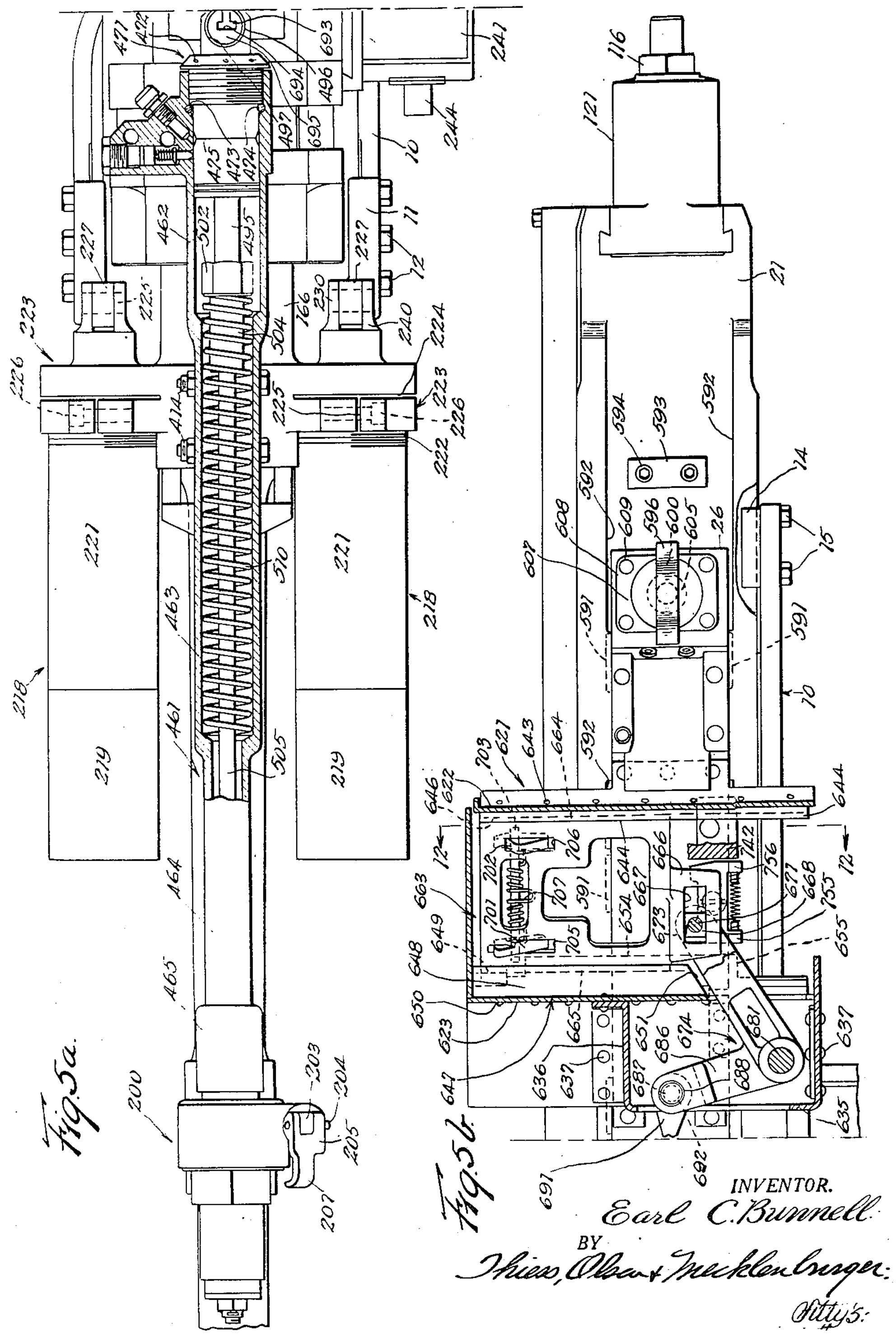
Figures 6A, 6B:
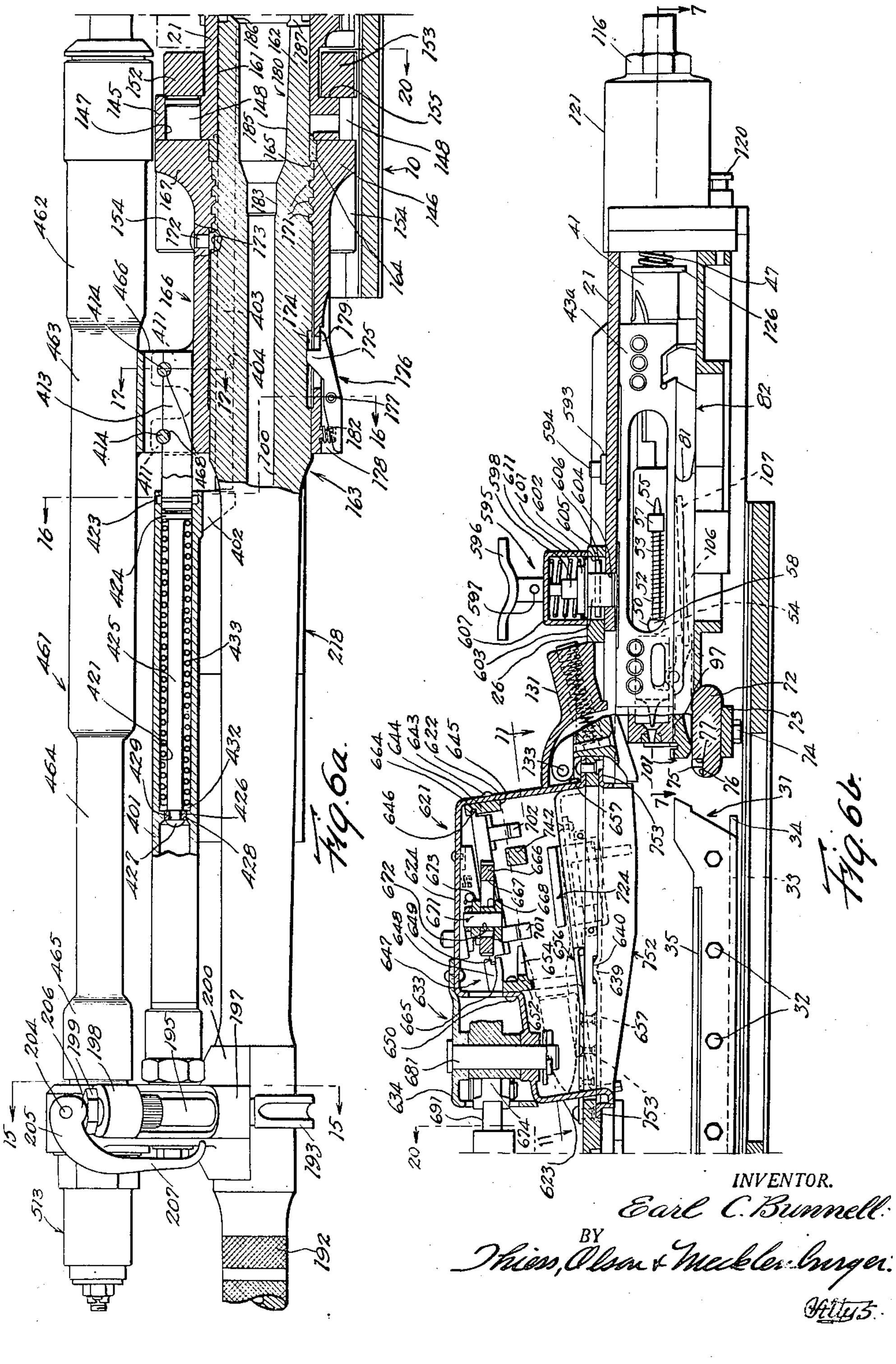
Figure 7:
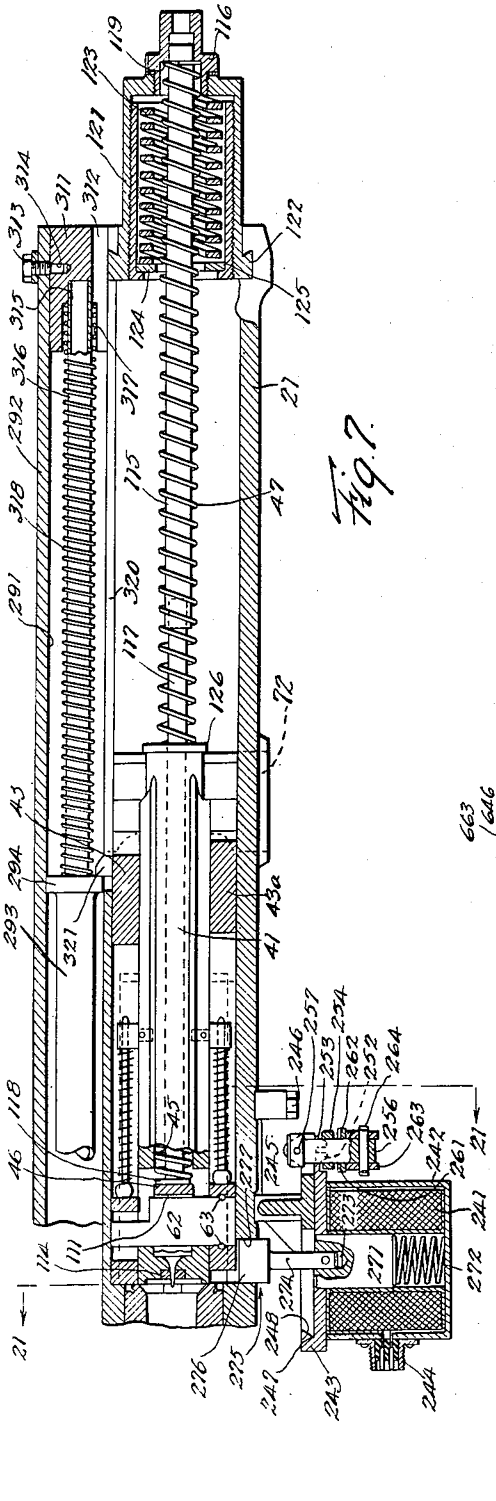
Figure 8:
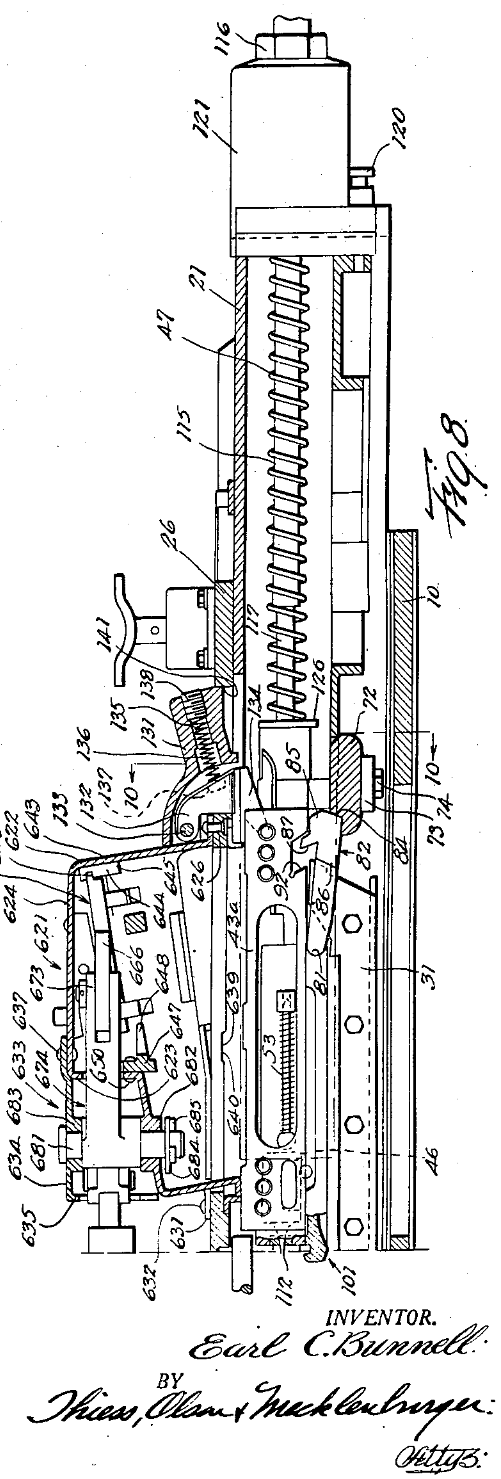
Figure 10:
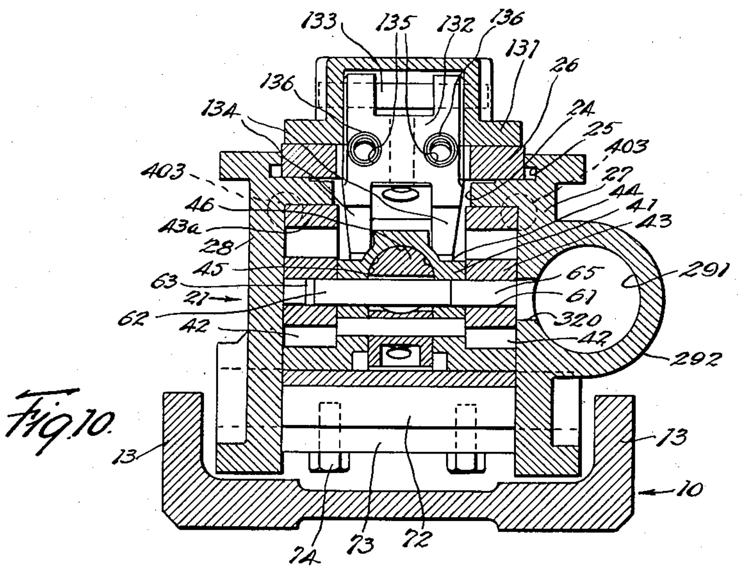
Figure 9:
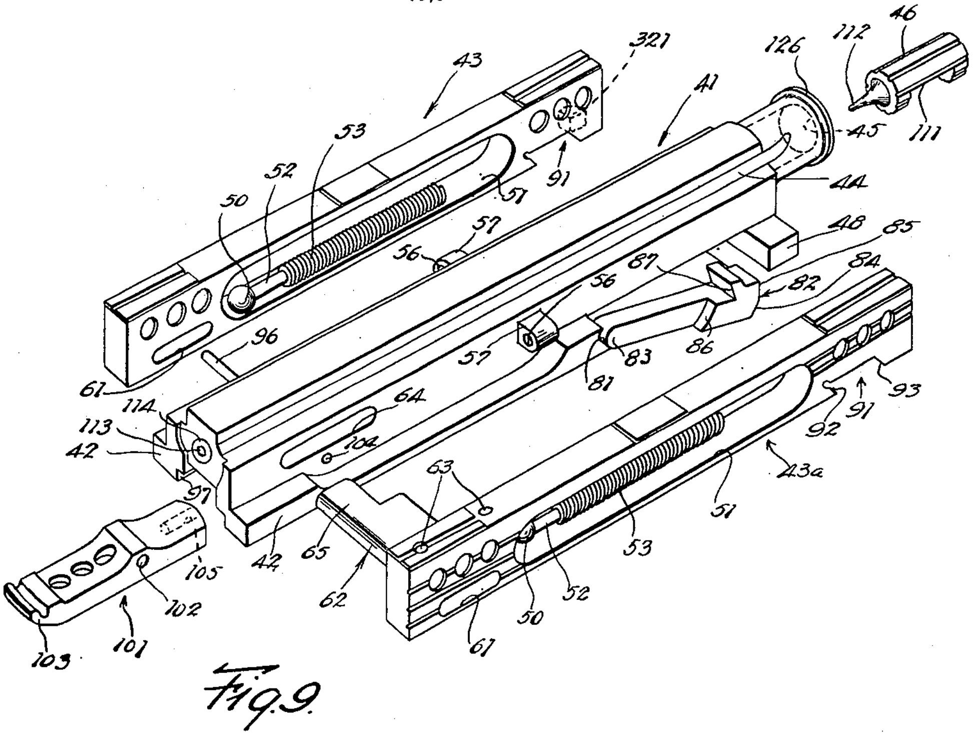
Figures 11, 13:
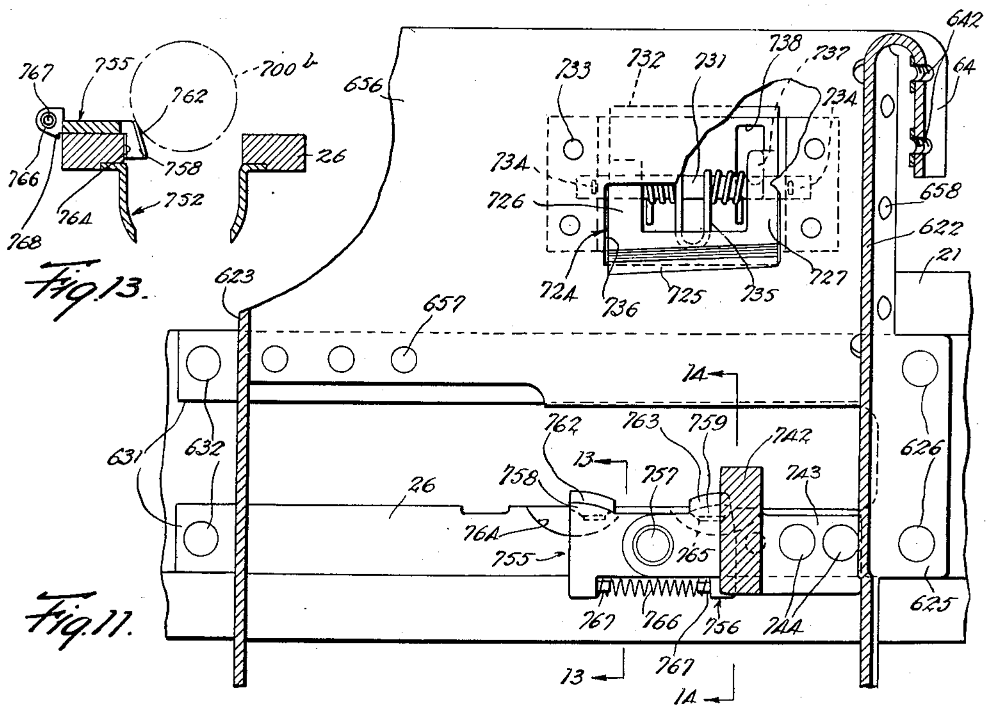
Figures 12, 14:
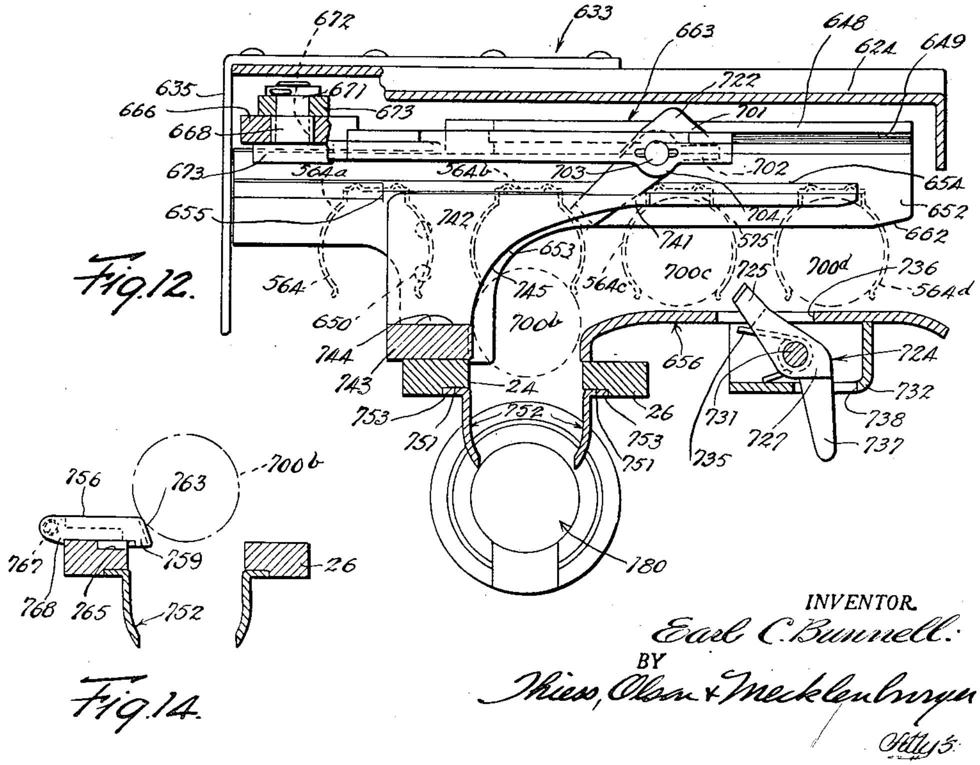
Figures 15, 16:
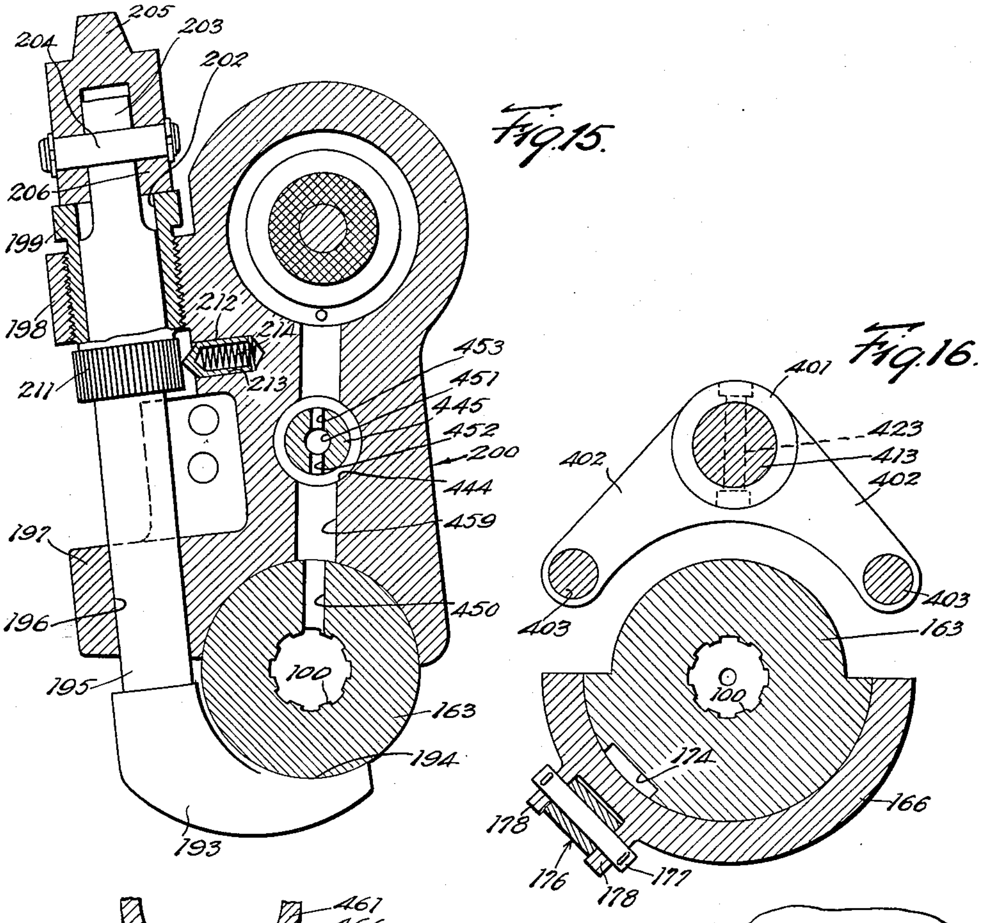
Figure 17:
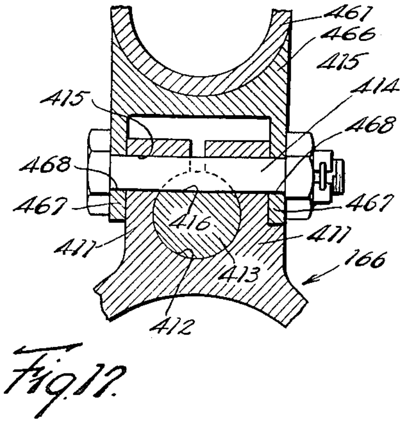
Figure 18:
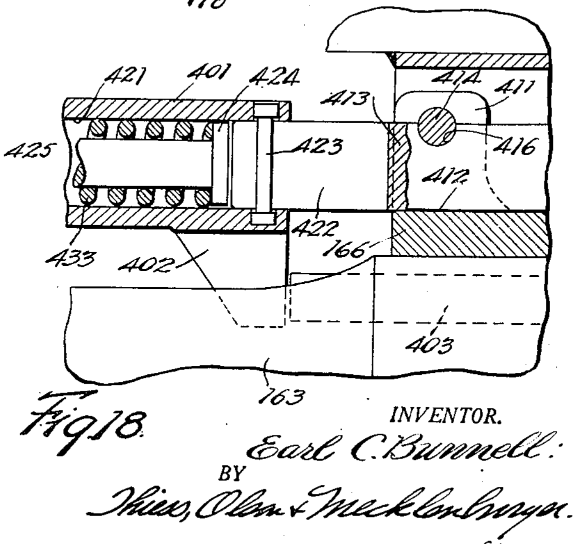
Figures 19, 23, 24:
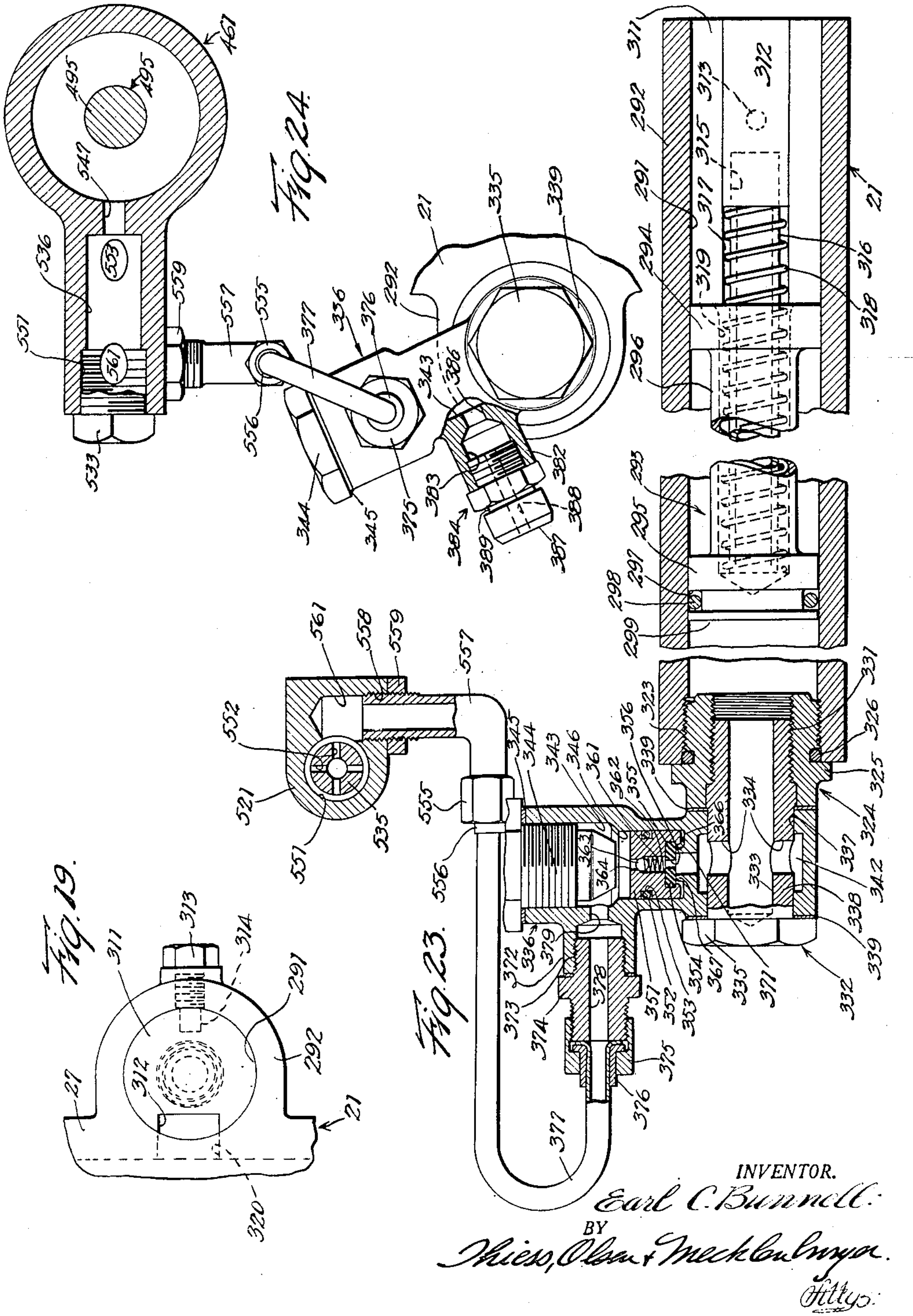
Figure 20:
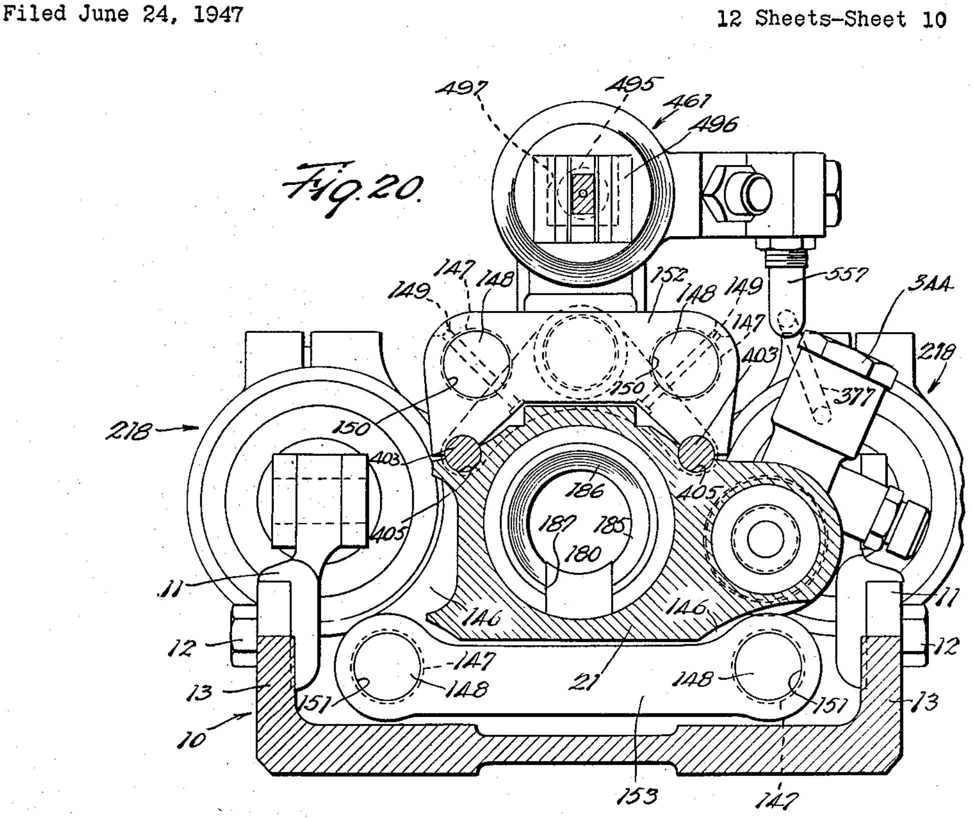
Figure 21:
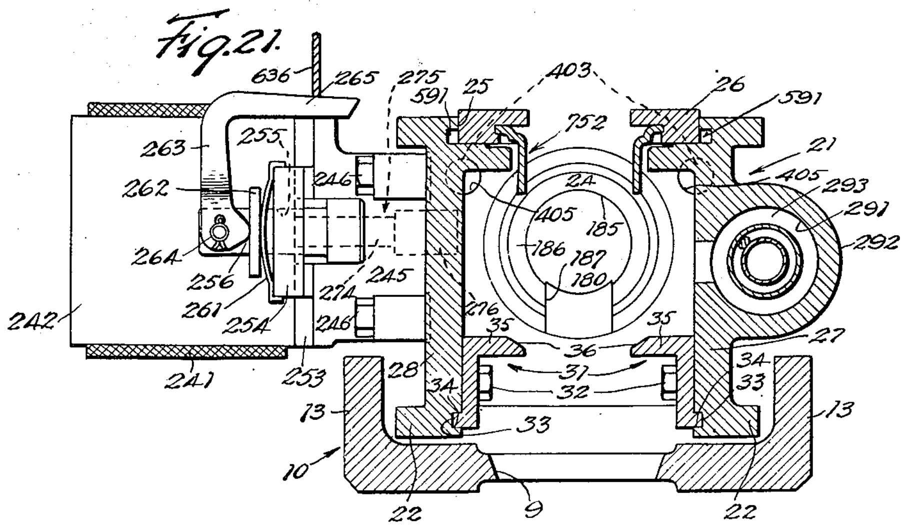
Figures 22, 25:
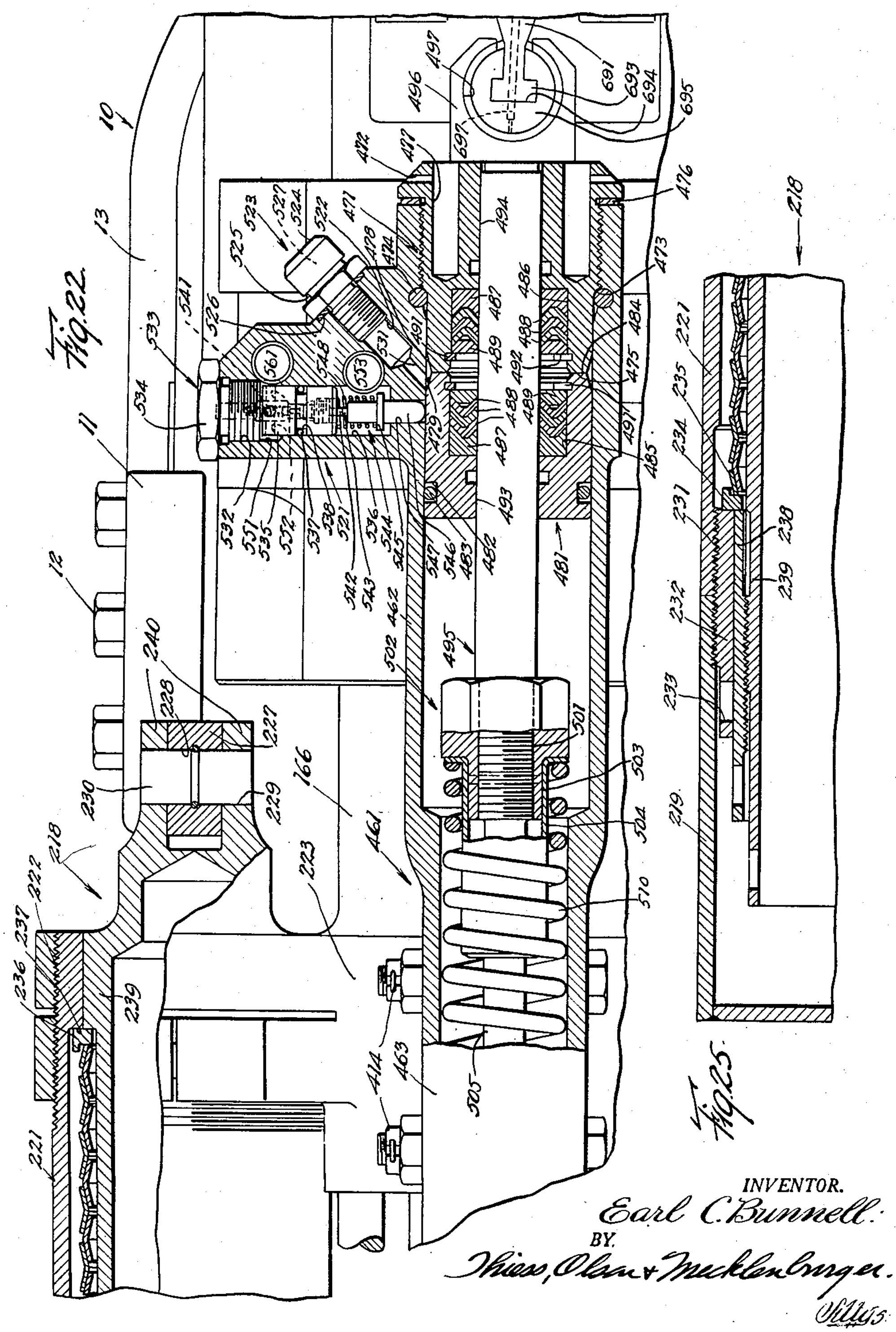
Figure 26:
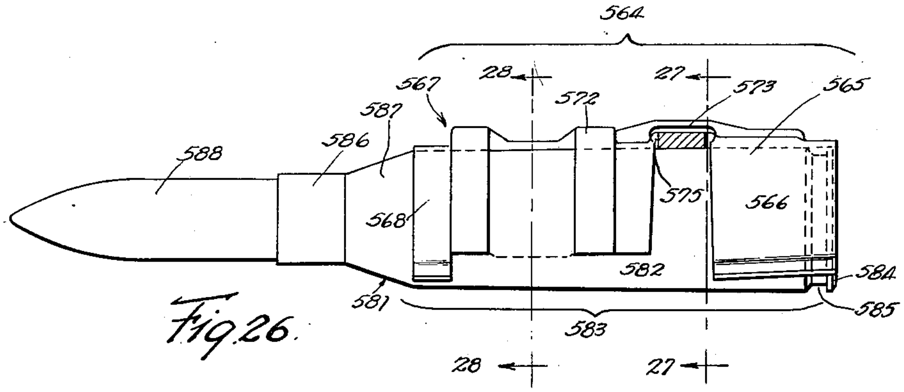
Figure 27:
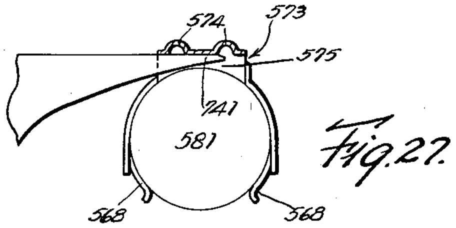
Figure 28:
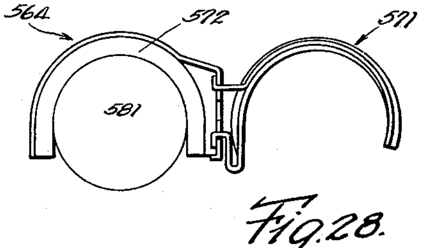
Figure 29:
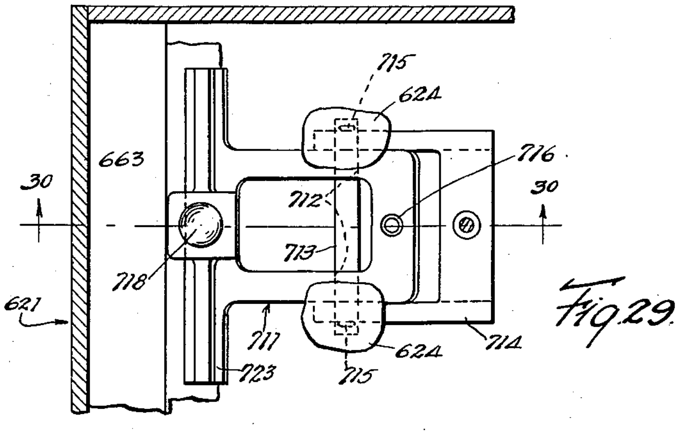

Figs. 3*a* and 3*b* constitute one view, being a left-hand side elevation of the gun, the view being broken into two parts, as indicated by the dot-and-dash line, in order to fit the limitations of the sheet;

Fig. 4 is an enlarged fragmentary view taken in the same plane as Fig. 3*a* and showing in cross section the forward portion of the bolt unlocking piston and the vent plug;

Figs. 5*a* and 5*b* comprise one view, showing a plan of the gun with certain parts cross-sectioned the view being broken as indicated by the dot-and-dash line, in accordance with limitations of sheet size;

Figs. 6*a* and 6*b* constitute a single view, showing a left-hand side elevation with certain parts of the gun indicated in longitudinal cross section;

Fig. 7 is a cross-sectional view taken along the line 7—7 of Fig. 6*b*;

Fig. 8 is a combined cross-sectional and left-hand elevational view of the gun taken substantially in a vertical plane through the axis of the gun;

Fig. 9 is an exploded perspective view showing the bolt, the breechblock slides, the breechblock lock, the extractor and minor parts appurtenant thereto;

Fig. 10 is a cross-sectional view taken substantially on the line 10—10 of Fig. 8;

Fig. 11 is a cross-sectional view taken substantially on the line 11—11 of Fig. 6*b*;

Fig. 12 is a cross-sectional view taken substantially on the line 12—12 of Fig. 5*b*;

Fig. 13 is a cross-sectional view taken on the line 13—13 of Fig. 11;

Fig. 14 is a cross-sectional view taken on the line 14—14 of Fig. 11;

Fig. 15 is a cross-sectional view taken substantially on the line 15—15 of Fig. 6*a*;

Fig. 16 is a cross-sectional view taken substantially on the line 16—16 of Fig. 6*a*;

Fig. 17 is a cross-sectional view taken on the line 17—17 of Fig. 6*a*;

Fig. 18 is a view in elevation and cross section showing the bolt unlocking yoke and guide;

Fig. 19 is a detail, viewed from the front of the gun, of the bolt charging cylinder;

Fig. 20 is a cross-sectional view taken substantially on the line 20—20 of Figs. 6*a* and 6*b*;

Fig. 21 is a cross-sectional view taken substantially on the line 21—21 of Fig. 7;

Fig. 22 is a partial view, somewhat enlarged, of a portion of Fig. 5*a* to show details of the pneumatic system;

Fig. 23 is a cross-sectional view taken axially of the bolt charging cylinder and certain parts appurtenant thereto;

Fig. 24 is a view looking toward the rear of the gun and showing the bolt charging cylinder, feeder operating cylinder, and certain connections therebetween;

Fig. 25 is a cross-sectional view of a portion of one of the recoil cylinders;

Fig. 26 is a detail showing a round assembled with its link and in relation to the stripping cam;

Fig. 27 is a cross-sectional view on the line 27—27 of Fig. 26;

Fig. 28 is a cross-sectional view on the line 28—28 of Fig. 26;

Fig. 29 is a cross-sectional view taken on the line 29—29 of Fig. 3*b*; and

Figure 30:
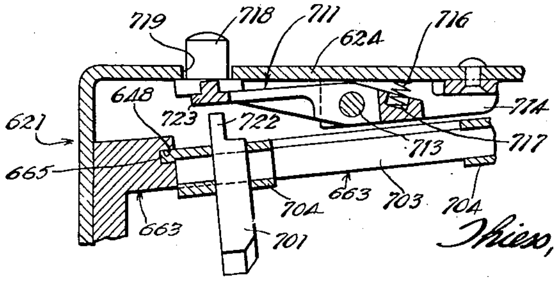

Fig. 30 is a cross-sectional view taken on the line 30—30 of Fig. 29.

In the several figures some parts have been shown broken away or omitted for clarity.

Inasmuch as the entire assembly may be conveniently considered as composed of several cooperative sub-assemblies, the construction of the gun, one exemplification of which is shown and described, will be detailed under appropriate subheads.

*The gun mount*

The mounting for the gun as a whole comprises a cradle 10 (Figs. 1, 2, and 10), preferably made of aluminum or magnesium alloy for lightness, narrower for the major portion of its length and wider toward the front to receive the pair of recoil unit brackets 11 supported by means of bolts 12 on upturned flanges 13 at either side of the cradle. Flanges 13 also support the pair of slide bearings 14 (Fig. 3*b*) attached thereto by means of bolts 15, there being one on either side of the gun and disposed toward the rear thereof. Each bearing 14 comprises a rectangular block having a slot 23 for a purpose to be described. The cradle 10 is provided with a plurality of apertures (not shown) by means of which the cradle may be secured to a suitable support, which may be fixed or mobile, and with a larger, sloping-sided, elongated aperture 9 (Fig. 21) through which the spent cartridge casings may be ejected from the gun.

*The receiver*

Forming the principal body portion of the gun, and housing the bolt, the breechblock slides, the breechblock lock, and certain appurtenant parts, is an elongated, generally rectangular hollow receiver 21, preferably a steel casting having its inner side and upper walls accurately machined for guiding the breechblock slides and bolt. At its two outer vertical side faces (Fig. 3*b*), the receiver 21 is provided with a pair of elongated outstanding ribs 22, each adapted to slide in a slot 23 in the slide bearings 14 and forming part of the means by which the recoiling portions of the gun are permitted to move with respect to the cradle 10. Receiver 21 is provided in its upper wall with an elongated slot 24 (Fig. 10) surmounted by a T-shaped slot 25 to accommodate the receiver slide 26 to be described.

Juxtaposed to the interior of the two side walls 27 and 28 of the receiver 21 are the two receiver slides 31 (Figs. 6*b* and 21) attached to the receiver 21 by means of cap screws 32 and held accurately in predetermined position by means of flanges 33, each engaging a slot 34 in the receiver. Each slide 31 is flanged inwardly as at 35 to support the bolt in its sliding movement, the upper outer edge of each flange 35 being chamfered as at 36 to provide clearance for the rounds during chambering and extraction. The rear end of each receiver slide 31 is provided with a cam formation to be further detailed.

*The bolt, breechblock slides, and appurtenant parts*

Referring to Figs. 9 and 10 particularly, the bolt 41 comprises an elongated one-piece member, as clearly shown, having laterally extending flanges 42 on either side thereof upon which the breechblock slides 43 and 43a are adapted to rest and slide. It will be noted that the thickness of the slides 43 and 43a is equivalent to the lateral width of the flanges 42, and that the over-all width of the bolt 41 measured at the flanges 42 is such as to provide a close sliding fit of the assembled bolt and breechblock slides between the inner surface of the walls 27 and 28 of the receiver 21.

Bolt 41 is provided on either side thereof with a longitudinal recess 44 for clearing the cartridge ejector to be described, and has a central circular aperture 45 (Fig. 10) to receive the firing pin 46 and driving spring 47 (Fig. 8). The bolt is also provided with a transversely disposed pad 48 to support and guide the rear end of the bolt 41 upon the slides 31 (Fig. 9).

Each breechblock slide 43 and 43a is provided with an elongated aperture 51 therethrough enclosing push rod 52 and compression spring 53 thereabout, the head 50 of the push rod being adapted to lie within a recess 54 (Fig. 6b) of spherical segmental form cut in the forward end of the aperture 51, the rearward end 55 of each push rod 52 being adapted to pass through an aperture 56 in the lug 57 extending laterally from the bolt 41. The rearward end of each spring 53 bears against the forward face of the lug 57, and the forward end of the said spring bears against the head 50, whereby the breechblock slides are constantly urged forwardly with respect to the bolt 41.

Breechblock slides 43 and 43a are provided with elongated apertures 61, the aperture associated with the slide 43a being adapted to receive tightly therein one end of the slide key 62, the latter being secured to the slide 43a by dowel pins 63. The slide key 62 passes freely through the slots 64 in the bolt 41 and 61 in the slide 43, it being understood that the clearance between the key 62 and the apertures 61 and 64 is such as to permit the slide 43 and bolt 41 to move freely longitudinally with respect to the key. The right-hand end of the key 62, i. e., the end 65 coextensive in length with the thickness of the breechblock slide 43, is somewhat narrower than the end secured in the breechblock slide 43a.

Passing through elongated apertures 71 (Fig. 3b), one in each side wall of the receiver 21, is the breechblock locking key 72 having a cross section of flat-sided oval form and locked transversely by means of a plate 73 (Fig. 10) secured at the bottom of the key by means of cap screws 74, the plate 73 being of the same width as the interior of the receiver 21. Key 72 is provided at its forward end with a recess 75 (Fig. 6b) having a horizontally disposed bottom wall 76 and a rearwardly inclined wall 77 for a purpose to be described.

Pivoted upon a substantially semi-circular recess 81 coextensive widthwise with the flanges 42 of the bolt 41 is the breechblock lock 82 (Fig. 9) having a substantially semi-circular forward end 83 to engage the recess 81, rearward locking surfaces 84 and 85, and camming surfaces 86 and 87, it being understood from Fig. 9 that the breechblock lock 82 is symmetrical about the vertical axial plane of the gun.

Each of the breechblock slides 43 and 43a is provided with a bottom recess 91 adjacent the rear end thereof, and of the contour shown in Fig. 9, there being a forward camming surface 92 and a rearward camming surface 93.

Adapted to lie within a suitable recess 97 in the bottom face of the bolt 41 is the extractor 101 (Fig. 9) having an aperture 102 transversely thereof whereby the extractor is pivoted on the pin 96 held in apertures 104 and the bolt 41. The forward end of the extractor 101 is provided with a claw 103 for engagement with the cartridge casing, the claw being transversely arcuate concentrically with the casing. At its rear the extractor is provided with a longitudinal aperture 105 into which is inserted one end of the resilient rod 106 (Fig. 6b) supported at its other end in a suitable aperture 107 in the bottom of the bolt 41.

The firing pin 46 (Fig. 9) is provided with a transverse recess 111 of slightly greater length (Fig. 7) than the key 62, whereby the pin 46 may slide axially a predetermined short distance with respect to the key. The forward end of the pin 46 is provided with the substantially conical nose 112 adapted to project through an aperture 113 in the hardened replaceable bushing 114 pressed into the forward face of the bolt 41 and flush therewith, the aperture 113 being suitably tapered to correspond to the taper of the nose 112 (Fig. 7).

*The bolt driving spring and buffer assembly*

For urging the bolt 41 and breechblock slides 43 and 43a forwardly, there is provided the driving spring 47 (Figs. 7 and 8) heretofore noted, the spring being supported and guided upon the tube 115 secured at one end in the cap 116 at the rear of the gun. The tube 115 is supported at its forward end on the rod 117 having an integral head 118 guided within the aperture 45 in the bolt 41. Spring 47 may be compressed freely within the aperture 45 and bears at its forward end against the head 118, the latter in turn abutting the rear face of the firing pin 46. At its rearward end the spring 47 bears against the inner wall 119 of the cap 116.

Adapted to be removably associated with the receiver body 21 is the buffer spring housing 121 engaged with the receiver 21 by means of a vertically separable dovetail joint indicated generally at 122, the buffer housing 121 and its associated parts being locked with respect to the receiver 21 by means of the manually operable pin 120 slidable in the housing 121 and normally urged into engagement with an aperture (not shown) in the receiver by means of a spring (not shown). After the driving spring 47, tube 115, and rod 117 are removed from the receiver by unscrewing the cap 116 from the housing 121, withdrawal of the pin 120 from its co-operating aperture permits the housing 121 and the parts enclosed thereby to be dissociated from the receiver. Reassembly is obviously the reverse of the steps just outlined. There is provided within the housing 121 a buffer spring 123 having a washer 124 abutting the front end thereof, the spring 123 and washer 124 being securely held within the housing by means of the threaded sleeve 125. The rear end of the bolt 41 is provided with an enlarged circular face 126 of sufficient diameter to bear against the washer 124 when the bolt is in its rearmost position.

*The ejector assembly*

Carried within a housing 131 (Fig. 8) attached to the receiver slide 26 is the ejector claw 132, pivoted with respect to the housing upon the pin 133, and bifurcated at its lower end (Fig. 10) to form a pair of forwardly extending claws 134 disposed at each side of the bolt 41 and lying within the recesses 44 of the bolt, there being an aperture 141 in the slide to clear the ejector assembly. Housing 131 is provided with a pair of apertures 135 to receive the compression springs 136 adapted to urge the ejector 132 in a clockwise sense and guided therein within apertures 137. Spring-retaining screws 138 are threadedly engaged in the housing 131, the ejector 132, therefore, being constantly urged about its pivot and limited in such forward movement by abutment against the edge of the aperture 141 of the housing 131.

*The barrel and barrel mounting*

The forward end of the receiver 21 is provided with a pair of upstanding ears 145, and the adapter 166 (to be hereinafter described) is provided with a pair of laterally extending ears 146 (Figs. 6a and 20), each of said ears 145 and 146 having an aperture 147 therethrough to receive the studs 148. Extending transversely of and bearing against the rearward face of the aers 145 is an upper yoke 152 adapted to receive one end of the studs 148 threaded into apertures 150 in the yoke 152, the studs being pinned by dowels 149. The lower pair of studs 148 is similarly threaded into apertures 151 in either end of a lower yoke 153 extending transversely of the receiver 21, and abutting the front face 155 of a slot therein.

At their forward extremities the studs 148 are threaded and engaged by the nuts 154, the said nuts being provided with hexagonal depressions, not shown, whereby they may be engaged by a wrench.

Receiver 21 is provided with a cylindrical aperture 161 at its forward end adapted to receive a corresponding cylindrical extension 162 of the barrel 163 and whereby the barrel is accurately positioned axially of the receiver. An annular shim or spacer 164 is positioned intermediate a shoulder 165 of the barrel and the adjacent end of the receiver. In order to support the barrel 163 with respect to the receiver 21, there is provided a hollow adapter 166 having a flared portion 167 including apertures (not shown) in alignment with the apertures 147 through which the studs 148 extend, the outer face of the portion 167 being appropriately counterbored to receive the nuts 154. Thus it will be seen that by means of the yokes 152, 153, studs 148, and nuts 154, the adapter 166 may be securely attached to the receiver 21.

To permit disassembly of the barrel 163 from the adapter 166, both the adapter and barrel are engaged by means of circumferentially interrupted buttress-thread sections generally indicated at 171, and of a common construction sometimes used on breechblocks, whereby upon rotation of the barrel 163 a portion of a turn, the interlocking threads are disengaged and the barrel may be withdrawn. To secure the barrel 163 against rotation, there is provided a dowel 172 adapted to engage a short peripheral slot 173 entering a space between two thread sections 171, thus permitting the barrel to be rotated for unlocking but to absorb the reaction due to the spin of the bullet.

Figure 2:
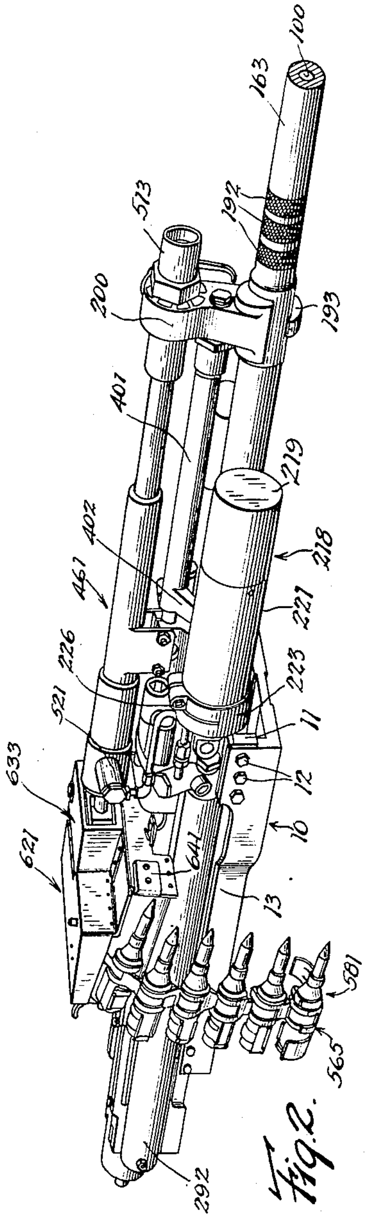
Fig. 2 is a perspective view showing the right-hand side of the gun.

To preserve the peripherally locked relationship of the barrel 163 with respect to the adapter 166, the barrel is provided with an axially extending slot 174 with which is adapted to engage the nose 175 of the barrel latch 176 pivoted at 177 with respect to the adapter 166 and guided within a slot 178 therein. A projection 179 limits inward movement of the nose 175 under urging of the compression spring 182 intermediate the front end of the latch 176 and the adapter 166. According, to unlock the barrel 163 from the adapter 166, the latch 176 is manually rotated clockwise, as seen in Fig. 6a, to disengage the nose 175 from the slot 174. The barrel is thus free to be rotated and unlocked as aforesaid. To facilitate grasping of the barrel for manual removal thereof from the adapter 166, the same may be periphrally knurled as at 192 (Fig. 2).

Barrel 163 comprises a breech or chamber 180 tapered, as indicated at 183 and 185, to receive the correspondingly tapered portions of the cartridge employed with the gun, the cartridge, when chambered in the breech 180, fitting snugly against the surfaces 183 and 185, and the groove and rim thereof being positioned at the rear end of the breech, the latter being chamfered as indicated at 186 to permit free location of the base of the cartridge, and also being provided with a radially extending recess 187 (Figs. 6a and 20) to receive the claw 103 of the extractor 101.

The bore 100 of the barrel continues from the surface 183 to the muzzle (the latter being omitted in all of the figures because of limitations of space). The bore is, as will be understood, of conventional construction, i. e., spirally rifled to yield lands and grooves for imparting to the projectile the appropriate rotary motion for true flight.

For supporting certain components to be hereinafter detailed, the barrel 163 is provided with a bracket 200 (Fig. 15), including a locking device comprising a hook 193 having an arcuate pad 194 adapted to engage the lower portion of the barrel 163, the hook continuing generally upwardly in an extended cylindrical shank 195 guided in an aperture 196 in a laterally extending projection 197 of the bracket 200. Bracket 200 is provided with another projection 198 disposed substantially above the projection 197 and threadedly receiving the adjusting nut 199 in the central aperture 202 of which the shank 195 is guided at its upper end. Shank 195 is reduced to a flattened portion 203 through which passes the pin 204, and arranged to pivot thereon is the locking lever 205 (Fig. 6a). Lever 205 is provided with a pair of camming surfaces 206 adapted to bear against the upper face of the nut 199, and includes a handle 207 by means of which the cam surfaces 206 may be brought into or out of engagement with the nut 199, and the hook 193 accordingly operated upwardly or downwardly to clamp or to release the bracket 200 with respect to the barrel 163.

In order that accurate spacing between the cam surfaces 206 and the pad 194 may be achieved, the nut 199 is, as hereinbefore mentioned, threadedly engaged with the projection 198 so that increase or decrease in said spacing may be effected by rotating the nut 199 with respect to the projection 198. To preserve the desired location of the nut 199, its lower terminus 211 is axially knurled, and adapted to engage with the serrations is the conical tip of the plunger detent 212 received in an aperture 213 in the bracket 200. The detent is urged outwardly into contact with the terminus 211 by means of a spring 214. Thus vibration of the gun is ineffective to disturb the nut 199 and hence the locked position of the hook 193.

*The recoil mechanism*

Referring now to Figs. 1, 2, 5*a*, 22, and 25, there is provided means for absorbing the recoil of the gun comprising a pair of recoil units 218, each including a cylinder 221 extending parallel to the axis of the gun, one disposed on either side thereof and threadedly engaged as at 222 with brackets 223 integral with and protruding laterally from the adapter 166. The brackets 223 are split at 224, the forward portion of the bracket being additionally split as at 225 to permit the same to be drawn together in a clamping action by means of the screws 226, thus to secure the cylinders 221 with respect to the adapter 166 after threaded assembly therewith.

Each cylinder 221 (Fig. 25) is internally threaded at 231 to receive the annular adjusting nut 232 having apertures 233 for engagement by a suitable wrench. Adapted to bear against the nut 232 is the collar 234 against which the forward end of the resilient structure 235 is adapted to bear, the opposite end of the said structure bearing against a corresponding collar 236 (Fig. 22) abutting a shoulder within the cylinder 221. A second adjusting nut 238 is rotatable within the nut 232 and also abuts the collar 234, the nut 238 in turn being threadedly engaged upon the recoil unit support 239 comprising a hollow cylinder, as shown, and terminating rearwardly in a bifurcation 240. The brackets 11 include an upwardly disposed ear 227 (Fig. 3*a*), through an aperture 228 of which apertures 229 in the bifurcation 240 passes the pin 230. Caps 219 threaded upon the nuts 232 serve to close the internal parts of the units 218.

The resilient structure 235 is well known in this art and comprises two alternated series of annular members of highly tempered spring steel of shallow V-shaped cross section, as clearly indicated in Fig. 25, alternate members having the the apex of the V directed inwardly, and the remaining members having the apex of the V directed outwardly. The structure thus constitutes a resilient assembly adapted to absorb energy with friction and to withstand the heavy recoil to which a gun of the type herein disclosed is subjected. Adjustment in the tension of the structures 234 is effected by means of the nuts 231 and 238. Inasmuch as the recoil units 218 are of a type frequently used in automatic guns, they form no part of the present invention. Suffice it to state, however, that upon recoil of the gun, cylinders 221 being secured to the adapter 166 will be actuated rearwardly against the force of the structures 235, the shock thereupon being transmitted resiliently to the cradle 10 through the support 239 and brackets 11.

*The trigger assembly*

For initiating and interrupting firing, the gun is electrically controlled through the medium of an electric switch or button actuated by the operator. Accessory controls may be used, as when firing is to be automatically interrupted as the gun is traversed with its trajectory intersecting some part of an aircraft and to avoid damage thereto. In such cases the firing is initiated by the operator, and control is then transferred to automatic devices designed automatically to aim one or more guns at the target and to track the same. Cutouts are provided for those guns whose trajectories are likely in some position to intersect a part of the aircraft, and firing is thus automatically interrupted while the trajectory intersects such part.

In any such event, the electrical circuit to the gun includes a switch or switches, a source of current, and the solenoid 241 (Figs. 7 and 21) having an iron yoke 242 carried on the base 243, the electrical conductors being attached by means of a suitable female plug (not shown) engaging a male receptacle 244 attached to the yoke 242. To enable simple detachment and attachment of the solenoid from and to the gun, there is provided a bracket 245 mounted by screws 246 to the receiver 21. One vertical edge 247 of the bracket 245 is beveled, as shown, to engage a correspondingly beveled rib 248 of the support 243. The latter is provided on its outer face with a pair of adjacent vertically disposed beveled ribs 252 and 253 adapted to mate with a correspondingly chamfered shoe 254. Shoe 254 has a circular aperture 255 loosely fitting a swingable bolt 256 pivoted to the bracket 245 at 257. A flat spring 261 backed by a washer 262 co-acts with a cam lever 263 pivoted at 264 on the bolt 256, the handle 265 being bent at right angles, as shown, for a purpose to appear.

Thus to remove the solenoid, the handle 265 is swung counterclockwise (Fig. 21) to rotate the cam surface thereof away from the washer 262, thereby freeing the shoe 254 which may be disengaged from the ribs 252 and 253. Consequently the bolt 256 and the parts supported thereon may be swung away from the solenoid, the edge 247 and rib 248 disengaged, whereupon the solenoid is freed for removal. Reassembly is obviously the reverse of the foregoing, the handle 265 when in locked position lying against the upper edge of the bracket 245. Accidental dislodgment of the handle 265 is prevented by the presence of the wall of the feeder housing indicated thereover in Fig. 21 and to be hereinafter described.

An armature 271 is slidable within the winding of the solenoid 241, being cylindrical in form and normally urged outwardly of the winding by a coiled compression spring 272. An aperture 273 axially of the armature 271 receives the shank 274 of the trigger 275, the latter having a head 276 flat-oval in cross section and slidable within a correspondingly contoured slot 277 through the left-hand wall of the receiver 21.

*The bolt charging assembly*

In order to charge the gun initially or to recharge the same in the event of a jam or misfire, there is provided pneumatic means, including an elongated cylinder 291 (Fig. 10) formed in a suitable formed projection 292 disposed longitudinally of the receiver 21, approximately at mid-height of the right-hand wall 27 and constituting in effect a protrusion of said wall. Adapted for reciprocating movement in the cylinder 291 and fitting snugly therein is the bolt charging plunger 293 (Figs. 7 and 23), including a rear flange 294 and a front flange 295 disposed at each end of a body 296. Lying in a recess 297 peripherally of the flange 295 is a ring packing 298 serving to seal the plunger with respect to the cylinder 291 and thus prevent air leakage beyond the forward face 299 of the flange 295.

A plug 311 is snugly fitted within the rear end of the cylinder 291, there being an axially disposed channel 312 for clearing a lug on the right-hand breechblock slide 43, as will be explained hereinafter. To secure the plug 311 with respect to the projection 292, there is provided a cap screw 313 (Fig. 19) passing through the wall of the projection and entering an aperture 314 in the plug 311.

Supported at its rear extremity in an aperture 315 in the plug 311 is the spring guiding and supporting tube 316 of sufficient length to extend within the plunger 293 when the latter is in extreme forward position. Surrounding the tube 316, and disposed at its rear end in an aperture 317 in the plug 311, is the bolt charging plunger spring 318, which at its forward end lies within an aperture 319 axially of the plunger and bears against the bottom of the aperture 319 of the plunger 293. The wall 27 of the receiver 21 has a slot 320 for the greater portion of its length to provide clearance for a lug 321 (Fig. 7) extending laterally from the rear extremity of the right-hand breech-block slide 43.

Referring particularly to Fig. 23, the forward end of the cylinder 291 is threaded at 323 to receive a correspondingly threaded adapter put 324 having a shoulder 325 bearing against ring packing 326 whereby to seal the joint intermediate the nut and cylinder. Nut 324 is hollow and is threaded at 331 to receive the bolt 332 having a blind axial aperture 333 and two diametrically opposed apertures 334 therein. Fitted between the front face of the adapter 324 and the head 335 of the bolt 332 is the quick release valve body 336 (Figs. 23 and 24), there being an aperture 337 therethrough snugly fitting the shank 338 of the bolt 332. Gaskets 339 are provided intermediate the valve body 336 and the nut 324 and head 335. It is to be noted that the aperture 337 is enlarged centrally for a major part of its length to form a chamber 342 substantially coextensive with the apertures 334.

That portion of the body 336 extending radially with respect to the axis of the cylinder 291 is generally cylindrical in form, and has a cylindrical aperture 343 threaded to receive the cap nut 344, the joint intermediate the body 336 and nut 344 being sealed by means of the gasket 345. The inner end of the nut 344 is reduced in diameter and is of frusto-conical form, as shown in Fig. 23, the face of the truncation serving as a limit stop for parts now to be described.

Aperture 343 is reduce slightly in diameter to join the cylindrical aperture 346 in which the quick release valve piston 351 is adapted to slide axially, the later being pneumatically sealed with respect to the aperture 346 by ring packing 352 retained in the peripheral recess 353. Piston 351 is provided in its lower face with a recess 354 into which is pressed the annular valve disc 355 having a central aperture 356, the outer corner of the recess being peened inwardly, as shown, to secure the disc in place. Also included in the piston 351 is an axial aperture 361 to receive the compression spring 362 urging the ball check 363 against the port 364, the latter being sufficiently smaller in diameter than the aperture 361 to form a seat for the ball. An annular lip 367 projects upwardly from the floor 366 of the aperture 346 and is adapted to form a seat for the disc 355. An aperture 371 extends through the floor 366 and thus communicates with the chamber 342.

Body 336 is provided with a laterally extending boss 372 internally threaded at 373 to receive the correspondingly threaded adapter 374. To the outer end of the latter are connected, by means of the nut 375, a compression bushing 376 and tube 377, the opening of the tube communicating by means of apertures 378 and 379 with the aperture 343. Tube 377 is, in turn, connected to the air manifold shortly to be detailed.

Referring to Fig. 24, the body 336 is provided with a second laterally extending boss 382 having a threaded aperture 383 to receive the threaded nozzle 384, the aperture 383 continuing into a reduced portion 386 in communication with the aperture 343. Nozzle 384 constitutes an air exhaust vent, it being noted in this respect that the aperture 386 is in communication with that part of the aperture 343 intermediate the lower face of the piston 351 and floor 366.

*The bolt unlocking assembly*

After each round is chambered, i. e., thrust by the bolt into the breech, the bolt 41 is locked for obturation by means of the breechblock lock 82 and the breechblock slides 43 and 43*a*, and in a manner subsequently to be pointed out. After firing, it becomes necessary to unlock the breechblock slides and bolt for discharge of the spent casing, and such function is performed throughout automatic firing. For effecting such part of the cycle, there is provided timed pneumatic means now to be detailed.

Disposed in axial alignment with the barrel 163 is the bolt unlocking plunger 401 (Fig. 6*a*) comprising a tubular member having an integral bifurcated rear abutment including identical arms 402 (Fig. 16). Adapted to be operated by the termini of the arms 402 is a pair of cylindrical rods 403 guided for axial movement in apertures 404 and 405 in the adapter 166 and receiver 21, respectively (Figs. 6*a* and 20). From Figs. 10 and 20 it will be noted that approximately one-quarter of the rear face of the rods 403 is exposed within the chamber of the receiver 21, and that each face abuts the forward end of a breechblock slide 43 and 43*a*.

For guiding the rear end of the plunger 401 for reciprocating movement, the adapted 166 is provided with upstanding ears 411 (Figs. 6*a*, 17, and 18) defining a cylindrical aperture 412 into which is tightly fitted the cylindrical guide 413. Bolts 414 passing through apertures 415 in the ears 411 and engaging notches 416 in the guide 413 may be tightened to grip firmly the guide in the adapter 166, the ears 411 yielding sufficiently to afford clamping action. The guide 413 at its forward end is slidably fitted in the elongated bore 421 of the plunger 401, the guide being slotted at 422 to engage a pin 423 secured in the plunger 401, thus to permit sliding movement of the plunger with respect to the fixed guide while maintaining the predetermined peripheral position of the plunger, i. e., with the arms 402 abutting the rods 403.

Slidable within the bore 421 is the piston 424 (Fig. 18) having an integral piston rod 425 terminating forwardly in a reduced portion 426 (Fig. 6*a*) which is peened over at its end 427 to secure the guide bushing 428 slidable in an aperture 429 constituting a reduced portion of the bore 421. Thus the piston 424 is guided at both of its ends for smooth operation with respect to the plunger 401. Interposed between the inner face of the piston 424 and a washer 432 is the compression spring 433.

At its forward end the plunger 401 (Fig. 4) is supported for reciprocating movement by means of the piston 434 comprising a cylindrical head 435 and a shank 436, the latter being pressed into the bore 421. To reduce the mass of the piston 434, it may be drilled out as at 437 and 438; and to prevent gas leakage, it may be provided with a plurality of peripheral grooves 441.

Supported in the gas port bracket 200 is the cylinder 442 having a reduced portion 443 tightly fitted within the aperture 444 and locked in position by a bolt 445 having a hexagonal head 446, the threads 447 of the bolt engaging corresponding threads in the cylinder 442. To provide a passage between the interior of the cylinder 442 and the co-operative chambers of the bracket 200 and of the bore 100, the bolt 445 has an axial blind aperture 451 and a pair of radial apertures 452 and 453 extending therefrom.

Bracket 200 is provided with passages 448 and 449 in communication with the aperture 444, the passage 449 being in communication with a port 450 extending through the wall of the barrel 163 to the bore 100 (Fig. 3*a*).

*The feeder operating mechanism*

Feeding of the rounds to the receiver is achieved by pneumatic means now to be detailed. First there will be described those elements of the feeder constituting directly co-operating parts of the pneumatically operated mechanism, and thereafter the feeder proper, constituting a rapidly detachable part of the gun, will be detailed. The round-feeding mechanism per se will be described only in so far as such description serves to explain the actuation thereof by those features of my invention claimed herein, the feeder itself and certain elements co-operative therewith being the invention of Roy S. Sanford, and described and claimed in his application Serial No. 661,545, filed April 12, 1946, which application is assigned to the same assignee as the present application.

Rigidly supported above the bolt unlocking plunger 401, and parallel therewith, is the feed operating cylinder 461 (Fig. 3*a*) comprising three portions 462, 463, and 464 of successively reduced diameter terminating forwardly in a portion 465 of greater diameter than portion 464, the principal support for the cylinder 461 being provided by a saddle 466 integral therewith, as by welding (Fig. 17), the downwardly extending sides 467 of the saddle each having a pair of apertures 468 engaged by the bolts 414 aforesaid, whereby the cylinder is firmly attached to the adapter 166.

Threadedly secured in the rear open end of the cylinder portion 462 is the head gland 471 (Fig. 22), the holes 472 in the exposed periphery thereof being provided for locking wires (not shown) as is common in ordnance for securing parts against loosening due to vibration. Gland 471 is provided with a shoulder 473 bearing against the ring packing 474 and terminates inwardly in an annular abutment surface 475. Shims 476 serve to adjust the location of the piston rod for proper feeding. A plurality of apertures 477 receive a spanner wrench for insertion and removal of the gland 471.

Reciprocably slidable within the portion 462 is the piston 481 having a peripheral recess 482 for retention of the packing 483 to seal the piston with respect to the cylinder wall. Piston 481 has an annular abutment surface 484, and piston 481 and gland 471 are internally recessed at 485 and 486, respectively, to receive packing comprising a seat 487, packing leaves 488, clamping ring 489, and snap ring retainers 491 received in grooves 492, the gland 471 and packing associated therewith constituting a stuffing box for the piston rod soon to be described, while the packing associated with the piston 481 prevents air pressure intermediate the gland and piston from leaking by the rod. Ring packings 474 and 483 serve a similar purpose.

Adapted for reciprocating sliding movement within central apertures 493 and 494 in the piston 481 and gland 471, respectively, is the piston rod 495 (Fig. 22), including a head 496 substantially of rectangular contour and having a cup-shaped opening 497 therein (Fig. 20). At a position substantially coincident with the juncture of portions 462 and 463, the rod 495 is reduced in diameter, as indicated at 501, and is threaded to receive the nut 502, the latter including a hexagonal head for engagement by a wrench and a reduced cylindrical portion 503 over which is carried the flanged sleeve 504. Interposed between the shoulder defined by the interior of the two cylinder portions 463 and 464 (Fig. 5*a*) and the flange of the sleeve 504 is the compression spring 510. Forwardly beyond the nut 502, the rod 495 is again reduced in diameter and continues (Fig. 3*a*) into a section 505 which is, in turn, reduced in diameter to form the terminal portion 506 threaded to receive a nut 507. Nut 507 serves to secure the piston 508 to the rod 495, said piston comprising a hollow body having a transverse wall 509 therein, an aperture 511 through the wall receiving the terminal portion 506.

Rod 495 is guided at its forward end in an aperture 512, in the cylinder 513, which latter includes an aperture 514, the latter communicating through a port 500 with the aperture 448. Cylinder 513 receives the piston 508 for sliding movement therein, the latter being provided with a plurality of peripheral grooves 515 for preventing leakage. The cylinder 513 is threadedly engaged in an aperture 516 in the bracket 200, and the said bracket carries an annular boss 517 snugly fitted within the cylinder portion 465 whereby to support the forward end of the cylinder 461.

Turning now to Figs. 20, 22, and 24, the cylinder 461 is provided with a housing 521 projecting from the right side thereof. An inclined passage 522 therein is threaded to receive the hose connector 523, including a head 524 having a peripheral groove 525, the gasket 526 sealing the joint between the housing 521 and the connector 523. The latter is of a common type to permit a mating hose terminal to be fitted against the head 524 and a nozzle extending from the terminal to be inserted in the aperture 527. A pair of manually operated tongs carried by the terminal may be engaged with the groove 525 to detachably secure the hose to the connector, whereby compressed air from a suitable source may be fed to the pneumatically operated parts of the gun.

Passage 522 is reduced in diameter to continue into a passage 531 which is in communication with the cylinder portion 462 at a point in the inner periphery thereof adjacent the plane of abutment of gland 471 and piston 481. It will be noted that gland 471 and piston 481 are chamfered at their outer abutting edges, as shown at 478 and 479, respectively, to provide a circumferential space therearound and with which passage 531 communicates.

Threadedly inserted in another aperture 532 perpendicular to the cylinder 461 is the timing valve body 533 (Fig. 22) comprising a head 534 and a body portion 535, the latter snugly fitting a reduced portion 536 of the aperture 532 and sealed with respect thereto by ring packing 537 retained in the peripheral recess 538.

Body portion 535 is internally apertured to contain a spring-operated ball check valve 541 of a common type, e. g., the actuating plunger 542 of the valve 541 extending slightly beyond the inner end of the body 535 and abutting a projection 543 integral with the timing valve striker 544. The latter includes a peripheral flange 545 and a camming button 546 guided within an aperture 547 in the wall of the cylinder 461. A compression spring 548 constantly urges the striker 544 inwardly to maintain the button 546 against the periphery of the piston 481.

Fluid communication between the aperture 536 and the space 551 is provided by a plurality of radially disposed openings 552 (Figs. 22 and 23), entrance to which is normally closed by ball check 541. For connecting apertures 522 and 536 for flow therebetween, a by-pass opening 553 is provided.

Reverting to Fig. 23, the tube 377 is connected by means of a nut 555 and bushing 556 to the elbow 557 threadedly inserted at 558 in the housing 521, and is locked by jam nut 559. Housing 521 also has an aperture 561 in communication with the elbow 557 and the aperture 551.

*The feeder assembly*

The gun of the instant invention is intended to utilize the link-feeding principle wherein a plurality of rounds, each carried in an individual link, are assembled for convenient loading and feeding of the rounds to the gun, the links being interconnected to form a flexible belt, as is well known in the art.

One form of link capable of being used with the gun of my invention is shown and described in the copending application of Roy S. Sanford, Serial No. 628,207, filed November 13, 1945, now Patent No. 2,480,972, issued September 6, 1949, entitled "Cartridge Belt Link," and assigned to the same assignee as the present application.

Referring to Figs. 26, 27, and 28, there is represented, by way of example, a link 564 as disclosed in the copending Sanford application aforesaid, although it will be comprehended from what follows that links of other constructions may be used, the desideratum being that such link be provided at least with resilient fingers for gripping a cartridge for delivery thereof to the feeder and for preserving a predetermined position of the cartridge stripped therefrom, as will be hereinafter detailed; and provided also with elements for engagement by the feeding and anti-backlash pawls and by the stripping cam, the said pawls and cam being described fully hereinafter. Such link includes a rear semi-cylindrical gripping portion 565, including tongues 566 resiliently embracing the base end of the cartridge casing, and a forward gripping portion 567, including tongues 568 resiliently embracing the forward part of the casing, both pairs of tongues extending below the horizontally disposed axial plane of the cartridge whereby the latter is gripped securely until it is desired to dislodge the round from its link.

For interconnecting successive links, the same are provided with members 571 and 572 adapted to interengage in a combined swiveling and hinging movement whereby the required flexibility is imparted to the belt while it passes from the magazine to the feeder. Inasmuch as the interconnection between links is relatively unimportant in so far as my present invention is concerned, further description of the details thereof will not be set forth. However, it is necessary that the link be provided with an element adapted to be engaged by the stripping cam to be detailed. In the link illustrated, such member is shown at 573 and constitutes a bridge intermediate the portions 565 and 572, the bridge being stiffened by corrugations 574 and so positioned with respect to the cartridge as to define a space 575 for entrance of the nose of the stripping cam between the bridge and the case.

The cartridge or round 581 comprises a case 582, including a slightly tapered principal portion 583, a base 584, and a peripheral extractor groove 585, the latter being engageable by a lug or lugs (not shown) forming part of the link whereby the cartridge is accurately located axially with respect to the link, and by means of which groove the case may be extracted from the breech after firing, as will be described. Forwardly of the portion 583 the case is reduced in diameter to form a neck 586, there being a steeply tapered portion 587 intermediate the neck and principal portion 583. The projectile 588 is of the usual form and determines the caliber of the gun, in this case 0.60 caliber, although obviously not limited thereto. Set into the center of the base 584 is a primer (not shown) adapted to be struck by the firing pin 46, as is well understood in this art.

That portion of the feeding mechanism directly cooperative with the receiver is carried on the receiver slide 26 heretofore referred to, which comprises an elongated flat plate having a plurality of laterally extending flanges 591 (Figs. 5*b* and 21) arranged in pairs at each side thereof and adapted to fit snugly in the T-slot 25, the latter being relieved as indicated at 592, whereby the slide 26 may be engaged and disengaged from the receiver 21. That is to say, the slide may be moved longitudinally with respect to the receiver until flanges 591 underlie the notches 592, whereupon the slide may be lifted to detach the slide and its appurtenant parts from the gun. Movement of the slide to disengaging position is determined by the stop plate 593 attached to the top of the receiver 21 by screws 594.

For locking the slide 26 securely in operative position there is provided a detent 595 (Figs. 5*b* and 6*b*), including a handle 596 engageable by the fingers and pinned at 597 to a body 598, the latter having a peripheral flange 601 and an adjacent similar flange 602 of slightly greater diameter, the body continuing to form a locking pin 603 engageable in an aperture 604 through the top wall of the receiver 21. To afford clearance for the pin 603, the slide has an aperture, including a circular portion 599 and diametrically opposed rectangular wing portions 600, a key 606 fastened through the pin 603 being guided within portions 600 thus to insure against rotation of the pin 603 and to maintain handle 596 in the predetermined position shown.

Enclosing the body 598 is the housing 607 having a hollow cylindrical body portion and a flanged base 608 through which pass rivets 609 for securing the housing to the slide 26. Intermediate the cover 607 and flange 602 is the compression spring 611 serving to urge the pin 603 into engagement with the aperture 604. Hence, before the slide 26 may be disengaged from the receiver as aforesaid, the handle 596 must be lifted against pressure of the spring 611 to disengage pin 603 from aperture 604 whereupon the slide 26 is free to be moved rearwardly. Key 606 not only serves to maintain handle 596 in the predetermined position shown, but permits the pin 603 to be retained upwardly and free of the aperture 604. The latter is accomplished by rotating handle 596 through 90°, whereupon key 606 comes to bear on the upper surface of the slide 26 and thus prevents pin 603 from entering aperture 604 under spring pressure. This eliminates the necessity of holding the handle 596 and frees the operator's hands for sliding the feeder housing rearwardly to remove it from the receiver.

Re-engagement of the pin 603 occurs when the slide 26 is moved forwardly and handle 596 turned 90°, the pin 603 reentering aperture 604 by reason of spring 611.

Figure 1:
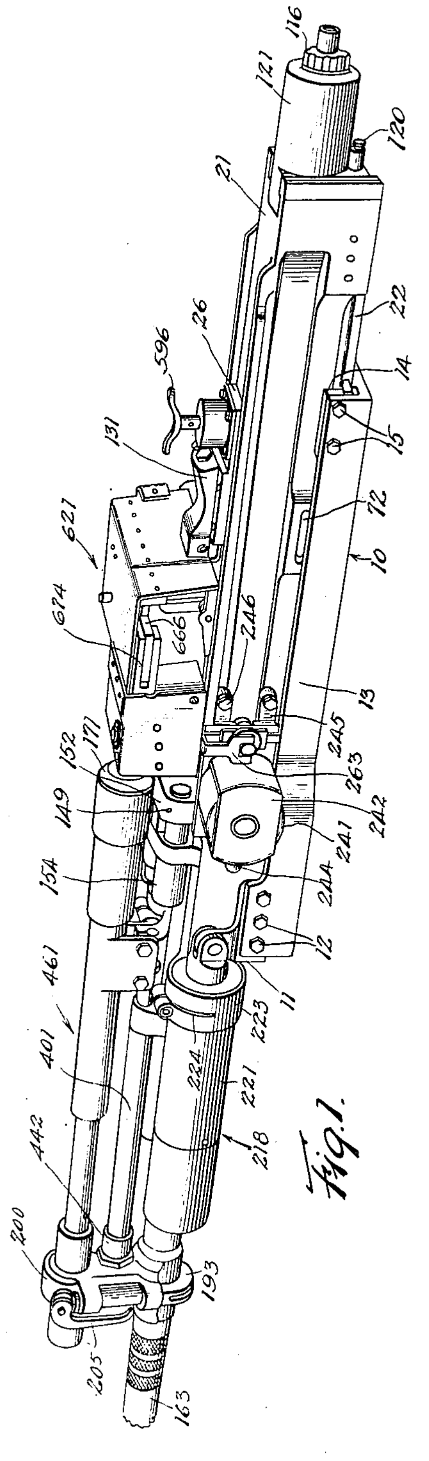
Figure 1 is a perspective view showing the left-hand side of the gun.

The cartridge belt is fed by mechanism supported in and on a housing 621 (Figs. 1, 2 and 6*b*). Said housing is substantially box-like and includes a rear wall 622, a front wall 623, and a top wall 624, the right-hand side being open (Figs. 11 and 12). Rear wall 622 is outwardly flanged at its bottom edge, as at 625 (Fig. 3*b*), and is apertured for the reception of rivets 626 by means of which that wall is attached to the slide 26. Front wall 623 is flanged at 631 for a similar purpose, the rivets being shown at 632.

A sub-housing 633 having a top wall 634, a front wall 635, and a left wall 636 is secured to housing 621 by rivets 637. As shown in Figs. 2 and 11, the rear wall 622 and front wall 623 are deformed at their right-hand edge into U-shaped brackets 641 having apertures 642 to which may be secured a chute from the magazine for carrying the belt of cartridges. However, the chute forms no part of my invention and has been omitted from the several figures. It will be understood from Fig. 2 that the portion of a belt there shown will in practice be within such chute, the arrangement of the belt in the chute being without significance in so far as my invention is concerned, provided, however, that the belt is initially nested in the chute in such fashion that it may be withdrawn freely therefrom by the action of the feeding mechanism.

Attached to the rear wall 622 (Fig. 6*b*) by rivets 643 is the transversely disposed, elongated guide rail 644 having a flat, smooth lower surface 645 and a longitudinal rectangular groove 646 along the inner face thereof, the guide extending over substantially the entire width of the wall 622 (Fig. 5*b*).

Secured to the front wall 623 (Fig. 5*b*) by by rivets 650 is an inverted, substantially L-shaped guide 647 having an inwardly extending leg 648 also provided with a longitudinal rectangular groove 649, the guide at its left end being fore-shortened at 651 (Fig. 5*b*) to clear the bell crank to be referred to presently, the downwardly extending leg 652 of the guide 647 having an inwardly directed ledge 654 extending transversely of the feeder and terminating at 655. The leg 652 (Fig. 12) is widened for a portion of its length to yield the downward projection 653 arcuately formed on one edge, as shown, and extending down to the upper face of slide 26.

Positioned intermediate the walls 622 and 623 is the floor 656 (Figs. 6*b* and 12), flanged at its front and rear whereby rivets 657 may be employed to secure the floor with respect to the housing 621 and slide 26. Floor 656 is downwardly arcuate at its right-hand or outer end to provide, together with the chamfered corner 662 of the leg 652, a flared throat wherein the rounds may enter the feeder. Guide 644 is correspondingly chamfered, although not shown.

Adapted to reciprocate in the guides 644 and 647 is the feeder slide 663 (Fig. 5*b*) comprising a rectangular plate-like member having laterally extending ribs 664 and 665 slidable in the mating grooves 646 and 649, and retained against lateral displacement by engagement of the sides of the slide with the inwardly disposed faces of the said guides.

Although the plane of reciprocation of the slide 663 is inclined from the horizontal, as shown, it is provided at its left end with a horizontally disposed projection 666, including a rectangular aperture 667 in which is adapted to reciprocate the block 668. A pivot 671 passes through an aperture 672 in the block 668, the pivot being fixed in one arm 673 of the bell crank 674, the latter being slotted (Fig. 8) to clear the projection 666.

Bell crank 674 (Fig. 5*b*) is rotatable on a shaft 681 supported in bushings 682 and 683 (Fig. 8) formed integrally with the housing 621 and sub-housing 633, respectively. A washer 684 and cotter 685 retain shaft 681 in position. The other arm 686 of the bell crank 674 (Fig. 5*b*) is bifurcated and directed inwardly of the gun, and includes an aperture 687 through the bifurcation to receive a pin 688 about which a connecting link 691 may pivot. The link 691 is shown best in Figs. 5*a* and 5*b*, the junction line between these two figures necessitating a broken showing of the part. The same is provided with an aperture 692 and a T-shaped head 693, the latter fitting snugly with a mating opening 694 in the button 695. When the slide 26 and its associated parts are detached from the gun, as heretofore explained, a disconnection occurs between the button 695 and head 496. To insure against accidental separation of link 691 and button 695, a dowel 697 is passed through suitable apertures in the link and button.

Step-by-step motion is imparted to the belt of cartridges by the engagement of pawls carried by the slide 663 with the cartridge links, such pawls being indicated at 701 and 702 (Figs. 5*b* and 12), and referred to herein as the front pawl and rear pawl, respectively. Both pawls are keyed for common rotation to a shaft 703, in turn supported for rotation in suitable bosses 704 (Figs. 12 and 30) forming part of the slide 663, there being slots 705 and 706 through the slide for reception of the pawls. For urging the pawls into link-engaging position, and to permit them to yield when returned to the right for engagement with the succeeding link, there is provided a duplex torsional spring 707 wound in two directions from its center (Fig. 5*b*) and terminating at both ends in axially extending fingers fitted in apertures in the pawls 701 and 702, the central portion of the spring being U-shaped to underlie the lower surface of the slide 663 and thus fix the spring for proper torsional action.

It is important that the mechanism be so arranged as to permit withdrawal of the belt of cartridges from the feeder from the right without firing the rounds carried thereby, as sometimes the inevitable difficulties common to every mechanism will develop, and, as will be pointed out hereinafter, the passage of the entire belt through the feeder toward the left necessitates stripping every cartridge therefrom. This is a laborious and time-consuming manual operation, and the bolt would have to be restrained from movement during that procedure.

Accordingly, to effect withdrawal to the right, the pawls 701 and 702 must be rotated to clear the links. I therefore provide a feed pawl depresser 711 (Figs. 29 and 30) comprising a T-shaped member having apertures 712 through which a shaft 713 is passed, the latter being supported in a two-armed bracket 714 riveted and welded to the top wall 624 of the housing 621. Cotters 715 insure against endwise movement of shaft 713. Depresser 711 is normally urged in a clockwise direction (Fig. 30) about the shaft 713 by a compression spring 716 retained in a hole 717 in the depresser, and the same is adapted to be urged in a counterclockwise sense by manual pressure on a button 718 integral therewith, and projecting for access through an aperture 719 in the wall 624.

Pawl 701 is provided with a lip 722 (Figs. 12 and 30), and the extended head 723 of the T-shaped depresser 711 is positioned thereover, the longitudinal extent of the head being such as to overlie the lip 722 at all positions of the pawl 701 during the reciprocation of the slide 663.

In view of the fact that the gun to which my invention is adapted is designed to fire at the rate of 600 to 700 rounds per minute, it will be apparent that the cartridge belt and cartridges are being moved intermittently at a high rate of speed. Not only does the return of the pawls 701 and 702 to the right impose reverse drag on the belt, but the mass of the belt and cartridges intermediate the throat of the feeder and the exit of the magazine will impose a similar drag.

Notwithstanding that one of the salient features of my invention involves the use of a cartridge stripped from its link to prevent backlash of the belt, it is desirable to provide secondary means for that purpose. Accordingly, there is provided a holding pawl 724 (Figs. 11 and 12) substantially of inverted U shape, the base of the U, constituting the head 725, being inclined as shown, to align with the taper of the links. The legs 726 and 727 of the pawl 724 are apertured to receive a shaft 731 carried in a bracket 732 riveted as at 733 to the floor 656 of the feeder. Cotters 734 secure the shaft 731 endwise. To maintain normal operative position of the pawl 724, a torsion spring 735, engageable at its center under the head 725 and at its tangential ends on the bracket 732, is provided, the coils of the spring surrounding the shaft 731.

To allow clearance of the pawl 724 through the floor 656, an aperture 736 is provided. For manual operation of the pawl 724 simultaneously with operation of the depresser 711, there is provided an integral handle 737 constituting an extension of the leg 727 and clearing the bracket 732 through a hole 738.

*The stripping cam*

As the belt of cartridges is passed through the feeder from right to left, each cartridge must be dislodged from its individual link for delivery to the receiver. In connection with Fig. 27, it was pointed out that each link includes a bridge 573, the same being so arranged as to define a predetermined gap 575 intermediate the bridge and the cartridge case 582.

Substantially coextensive with the gap 575 is the nose 741 (Figs. 3b and 12) of the fixed stripping cam 742, the latter comprising a base 743 by means of which the cam is secured to the slide 26 by rivets 744. Cam 742 is inclined forwardly, the principal plane thereof being perpendicular to the plane of travel of the belt and cartridges as they progress toward the cam. The nose 741 is bill-shaped, as shown, whereby the nose may enter the gap 575 with a minimum of friction, the upper face of the cam being parallel to the plane of travel of the belt through the feeder, and the lower face being arcuate, as shown at 745 (Fig. 12), to guide the rear portion of the cartridge smoothly to the receiver mouth to be described. At its forward extremity the cartridge is guided by the similarly arcuate edge of the projection 653.

*The receiver mouth*

The lower face of the receiver slide 26 is recessed at 751 (Figs. 6b and 12) to receive the mouth 752 which comprises a sheet metal member of box-like form open at the top and bottom, the upper edge thereof being flanged, as at 753, to lie within the recess 751, the mouth being secured by its interposition between the slide 26 and receiver 21 (Fig. 21), and obviously detachable upon removal of the slide from the receiver. Ears 639 (Fig. 6b) of the flanges 753 are engaged in corresponding recesses 640 in the slide 26 in order that the mouth 752 may be withdrawn from the receiver 21 when the slide and the parts carried thereby are removed from the receiver. Ears 639 are retained in recesses 640 by the tension of the walls of the mouth. Thus after the slide 26 and mouth 752 are removed together as aforesaid, the mouth may be detached from the slide by pinching the walls of the mouth together, which disengages the ears 639 from recesses 640.

Mouth 752 varies in cross-sectional contour from rear extremity to front extremity. As seen in Fig. 12, the walls over approximately the rear half extend downwardly in flat planes and continue inwardly in cylindrical segmental planes, the spacing between the flat planes being only slightly greater than the diameter of the cartridge at its base end. From a point approximately midway of the length of the mouth (Fig. 6b), the walls are tapered upwardly, which effects a gradual elimination of the arcuate plane wall portions to yield only flat plane wall portions (Fig. 21). The function of the wall shape of the mouth just described will be detailed hereinafter.

*The last round holding pawls*

To insure reliable delivery of cartridges to the receiver, it is important that the last round in the belt be retained above the mouth until a succeeding cartridge is deposited thereover, the stripping of that successive cartridge from its link applying the necessary force and momentum to the last round aforesaid for proper location thereof in the mouth and thence into the receiver, all of which will be amplified upon in what follows.

After a round is stripped from the belt, and assuming that the vertical and horizontal axial planes of the gun as seen in the drawings are substantially vertical and horizontal, respectively, as regards the plane of the earth, gravity alone will tend to carry the round into the mouth, and means must be provided just sufficient in effect to restrain the last round against movement by gravity, but capable of being overcome by the pressure over the last round of a succeeding round. Moreover, in mobile guns during movement of the mount, and during traverse of the gun in tracking the target, forces of inertia of unmeasurable extent will affect the proper positioning of the rounds between the time they are stripped and the time of chambering. Hence it is necessary to devise means enabling a substantial degree of control to be exercised on the rounds during that period to insure reliable and uniform transfer of a round from the belt to the breech.

Such means for the purposes aforesaid includes a pair of pawls 755 and 756 (Figs. 11, 13 and 14) supported for rotation on a common pivot 757 fixed in the receiver slide 26. Pawls 755 and 756 are similar in form and function, having a downwardly extending lip 758 and 759, respectively, the inner, curved, cam-like faces 762 and 763 of which, respectively, are sloped substantially tangentially to the round held thereby, as seen in Figs. 13 and 14, the round being indicated by dot and dash lines, and the cam-like faces 762 and 763 being contoured arcuately when seen in plan (Fig. 11). By reason of the sloped and curved active faces 762 and 763, cam surfaces are presented to the conical surface of the cartridge case whereby the pawls may be released by force from above exerted upon the round held thereby. The slide 26 is provided with clearance notches 764 and 765 for permitting movement of the lips 758 and 759. Pawls 755 and 756 are maintained in effective position by a compression spring 766 retained upon pegs 767 in the pawls, while overtravel thereof by virtue of the spring is obviated by projections 768 engaging the left-hand edge of the slide 26.

*Operation*

Assuming that the breech or chamber 180 is empty, and firing is to commence, it is necessary to insert the first round in the chamber, i. e., "to chamber" the same. This step necessitates the presence of a round on the last round holding pawls 755 and 756 or, if the gun is completely empty, the placing of a round on those pawls. Usually the last round of a previous belt remains on the pawls. Such round is indicated by dot-and-dash lines in Figs. 13 and 14 by the numeral **700*b***.

Following such positioning of a round, the belt of succeeding rounds may be inserted in the feeder. This is accomplished manually by taking the end of the belt from the chute and passing the same through the feeder from the open right-hand side or throat of the housing 621, the rounds being supported from below on the floor 656, and restrained endwise by the engagement of the base thereof against the interior face of the wall 622 and by the nose thereof against the inner face of the wall 623. Reference is made to Fig. 6*b* wherein the cartridge is indicated by dot-and-dash lines, and Fig. 12 wherein the rounds and links are similarly shown. Retention downwardly of the rounds is effected by the ledge 654 being adjacent the front portion of the case 582 and the lower surface 645 of the rail 644 being adjacent the rear portion thereof. Thus the rounds and their associated links are effectively guided in their passage through the feeder, the relative dimensions of the rounds, links and feeder parts being such as to minimize undue play while permitting comparatively frictionless passage. It is to be noted that the belt is moved into the feeder until the first round thereof is caught by the pawl 724.

Now that a round is on the holding pawls 755 and 756, and the belt is in position in the feeder, the gun may be initially charged. By means of a valve under the control of the operator, compressed air is admitted through a hose and nozzle (not shown but heretofore referred to) into the connector 523 (Fig. 22), passing through the aperture 527, passages 522 and 531 and into the space defined by the chamfered faces 478 and 479 and the wall of the cylinder portion 462, the piston 481 being at this time in the position shown.

As long as piston 481 is in the position indicated in Fig. 22, the button 546 is pressed radially outwardly of the cylinder 461 and valve 541 is open. However, at a certain phase of the cycle to be described hereinafter, piston 481 is forwardly in said cylinder 461 and button 546 is released and moves, under pressure of spring 548, to a position wherein the inner tip of the button lies within the cylinder wall. However, should the piston 481 at the time of charging be at a position ineffective to maintain button 546 outwardly of the cylinder, air admitted through aperture 527 enters by-pass 553 and aperture 536 is effective to maintain open position of valve 541. Stated otherwise, valve 541 may be opened either by actuation of button 546, by piston 481, or by air pressure thereagainst. It will be understood that during automatic fire, no air pressure exists through by-pass 553, and operation of valve 541 is exclusively under the control of button 546, in turn actuated by piston 481.

Thus the compressed air, after passing through valve 541, may pass through apertures 552, 551, and 561 (Figs. 23 and 24), flow through elbow 557, tube 377, apertures 378, 379, 343, and 364 to open ball check 363 against pressure of spring 362, thence through apertures 361, 356, 371, 342, 334, and 333 to cylinder 291. Air pressure against face 299 of piston 293 forces the same rearwardly against the force of the spring 318 until motion is stopped by abutment of the flange 294 against the plug 311. Rearward motion of piston 293 carries with it the lug 321 (Fig. 7) integral with the right-hand breechblock slide 43, which latter, through the medium of the key 62, carries with it the bolt 41 and left-hand breechblock slide **43*a*. Meanwhile, driving spring 47** is compressed and the gun is cocked, air pressure alone maintaining that condition.

After the gun has been cocked as aforesaid, air pressure is released by operating the valve controlled by the operator and already referred to. Upon drop of pressure exteriorly of the gun, the air stored in the cylinder 291 and its interconnected passages exerts pressure against valve 541 (Fig. 22) to maintain the same in closed position, and thus prevent return of the piston 293 (Fig. 23) and the parts actuated thereby. Valve 541 safeguards synchronism between the feeding mechanism and operation of the bolt by assuring that the cartridge is fed into the mouth and is ready to be picked up by the front face of the bolt before the bolt returns to the mouth to contact the base of the cartridge.

As shown in Fig. 22, the piston rod 495, together with the nut 502, is normally urged rearwardly of the gun by spring 510. Piston 481 is as shown in that figure, and the bell crank 674 is rocked clockwise from the position shown in Fig. 5*b* to position the slide 663 and its associated parts to the left. Upon admission of compressed air into the space defined by surfaces 478, 479, and the wall of the cylinder portion 462 (Fig. 22), air pressure against face 484 of the piston 481 will force the same to the front of the gun to carry the nut 502, rod 495, and the parts associated therewith forwardly to actuate the bell crank 674, and to move the slide 663 to the position shown in Fig. 5*b*.

In order to insure that the gun is charged, i. e., that the bolt is in the rearward or open-bolt position prior to the instant when a cartridge is fed by the feeding mechanism, it is necessary to provide a delay between the time the bolt is released for forward movement and the delivery of a round in front of the bolt. Such delay is provided by the timing valve operating in conjunction with the piston 481. Thus when piston 481 is in the position shown in Fig. 22, camming button 546 is outwardly of the cylinder 462, and the timing valve 541 is open. Accordingly, air admitted through connector 523 finds a free path through passage 553, aperture 536, thence through the valve 541, apertures 552, (Figs. 23 and 24) passage 561, tubing 377, aperture 379 through ball check valve 363, thence into the charging cylinder 291 to force the charging plunger 293 rearwardly in the manner already pointed out. Inasmuch as it will be understood from Fig. 22 that piston rod 495 is at this time in its rearward position under urging of the spring 510, and that the nut 502 is in abutting relation with the piston 481, such piston may not be moved forwardly of the gun unless substantial air pressure exists. Therefore, when charging piston 293 is fully to the rear, compressed air through passage 531 is then effective against face 479 of piston 481 to move the piston rod 495 forwardly to prepare the feeder for the feeding of the next cartridge into the receiver. Briefly then the bolt is retained rearwardly by piston 293 while the round is being fed to chambering position.

Following the cycle of operations outlined in the preceding paragraph, movement of piston 481 forwardly from the position shown in Fig. 22 releases the button 546, which may then move inwardly of the cylinder 461 to close the timing valve 541. At this time the operator will have released the air pressure from the cockpit or other control point, so that spring 510 is free to expand to feed the succeeding cartridge.

It will be understood from what follows that during automatic firing, rod 495 is reciprocated axially, and for clarity in the description and drawings the forward position thereof is indicated, piston 481 being effective only during the initial charging operation. Reciprocation of the rod 495 constantly maintains piston 481 in the position illustrated in Fig. 22, since during automatic fire there is an absence of air pressure against face 484.

Actuation of the slide 663 from left to right carries the pawls 701 and 702 to feeding position (Fig. 12) whereby the same may engage a link 564c, the ends of the pawls abutting thereagainst. In Fig. 12 the pawls are shown at the end of their feeding stroke, having previously engaged and positioned link 564b above the mouth 752 and in alignment with the axis of the gun. During reverse movement, i. e., left to right movement, of the slide 663, pawls 701 and 702 drag idly over the top of the link 564c about to be fed, the spring 707 maintaining the pawls in operative position. It is to be noted from Figs. 6b and 26 that the pawls engage the link and are thus prevented from touching the case 582. Any such contact would be likely to injure the casing and cause jamming of the round in the breech. In order to insure positive engagement of the pawls 701 and 702 with the link for feeding, a predetermined amount of overtravel of the pawls is provided for by so arranging the stroke of the rod 495 or the proportioning of the arms of the bell crank 674 as to move the slide 663 slightly more than the belt pitch distance (Fig. 31).

As explained, it is necessary that a round be held above the pawls 755 and 756, e. g., 700b (Figs. 12, 13, and 14). Upon feeding of the belt, the succeeding round 700c is stripped from its link 564c, the nose 741 of the cam 742 entering the space 575, and due to the increasing width of the cam 742 as the link advances thereagainst, the round is dislodged from the tongues 566 and 568 and against round 700b. Thus sufficient force is exerted against round 700b to swing the pawls 755 and 756 about their pivot 757 and so permit that round to be thrust into the mouth 752, the contour of the latter being such as to allow a segment of the base 584 to lie in the path of the bolt 41. At this time the bolt is retracted and the round is positioned in the path thereof.

As pointed out, the operator has released the air pressure at aperture 527, thereby allowing piston 481 to be returned to the position of Fig. 22, the spring 510 effectuating such return. Return of piston 481 causes cam surface 479 to urge button 546 outwardly to open valve 541, whereupon pressure previously maintained in cylinder 291 is relieved to exhaust through aperture 388 (Fig. 24). Such exhaust path is provided for a reason now to be explained.

It is desirable to exhaust cylinder 291 as rapidly as possible since, if the pressure were relieved through the same path by which it was created, the charger piston 293 would return too slowly. For example, if the gun of my invention were mounted on an aircraft, the hose intermediate the connector 523 and the cockpit, wherefrom the gun is controlled, would be of considerable length, and if exhaust were allowed to occur throughout such length of tubing, return of piston 293 would be decelerated unduly and disadvantageously, since in automatic armament, speed is of the essence.

Accordingly, to provide a substantially shorter path for exhaust from the cylinder 291, I include the quick-release valve inclosed in the body 336 and previously detailed. Upon release of air pressure by the operator, no force exists above the piston 351 (Fig. 23), and back pressure in the cylinder 291 is effective against the disc 355 to lift the piston 351. Thus communication is effected between the cylinder 291 and aperture 386 (Fig. 24) whereby exhaust may occur rapidly through opening 388 to atmosphere. Thereupon piston 293 is rapidly returned to forward position by spring 318, and the breechblock slides 43, 43a, and bolt 41 may be simultaneously moved forward by driving spring 47.

At this time, however, it may be assumed that trigger 275 is inwardly of the receiver, i. e., the gun is being charged but is not ready for firing, the solenoid 241 being de-energized and spring 272 being effective to urge the trigger inwardly and in the path of the left-hand breechblock slide 43a. As a consequence, the key 62 carried by the slide 43a withholds the firing pin 46 retracted, and detonation of the round cannot occur. As the bolt is returning to forward position, it abuts the round 700b lying in the mouth 752 to slide the same thereout of and into the breech 180, whereupon continued movement of the bolt chambers the round and obturation is complete.

Notwithstanding retention of the slide 43a by the trigger 275, the slide 43 may move to its extreme forward position, i. e., in advance of the slide 43a, the reduced right-hand end of the key 62 cooperating therewith in permitting such advanced movement.

Locking of the bolt 41 in forward position is achieved by breechblock lock 82 engaging the breechblock locking key 72 (Fig. 8), such locking action being well known in the art and hence forming no part of my invention. In turn, the bolt 41 through the medium of the springs 53 maintains the slides 43, 43*a* in forward position, the independence of said springs enabling slide 43 to take up a position in advance of slide 43*a*, as described.

The gun is now charged and ready to fire. To commence automatic fire, the operator closes a circuit (not shown) through the solenoid 241, or, in the case of automatic gun control, such circuit may be closed by means not under manual control, and the trigger 275 is withdrawn. Left-hand breechblock slide 43*a* is thus tripped and may move forward, under urging of its spring 53 and driving spring 47, to carry with it the firing pin 46, the nose 112 whereof strikes the primer of the round to detonate the same.

Upon discharge of the projectile 588, the explosive gases thereby released are utilized for continued automatic fire for as long as the solenoid is maintained energized. Such automatic operation will now be detailed.

As soon as the projectile moving through the bore 190 of the barrel passes the gas port 450 (Fig. 3*a*), the case 582 still being held in the breech 180 by the bolt 41, the pressure of the expanding gases of explosion is communicated through the port 450 to operate the bolt unlocking mechanism and the feeding mechanism, as will now be detailed.

Gas, at a pressure of approximately 50,000 lbs. per square inch, enters the port 450 (Fig. 3*a*), the spent case in the breech and the projectile in the muzzle maintaining a closed chamber for development of the pressure, thence through the passage 449 (Fig. 4), apertures 444, 452, 453, and 451 to the cylinder 442 to drive the piston 434 and the bolt unlocking plunger 401 connected thereto to the rear. Plunger 401 moves integral arms 402 in the same direction to actuate the rods 403 (Fig. 16) which in turn thrust against the breechblock slides 43, 43*a* (Fig. 10). Thus the slides are moved rearwardly against their associated springs 53 until the recess 91 (Figs. 8 and 9) of each slide is disposed above the rear end of the breechblock lock 82. At this moment cam surfaces 92 and 87 are in contact, and due to the angular relationship between said surfaces, the lock 82 is lifted by sliding and camming action between said surfaces to disengage the lock 82 from the key 72, the lock pivoting at 81 and 83, and the lock sliding over the key to permit continued rearward movement of the slides 43, 43*a*, and bolt 41.

The preliminary movement of the slides 43, 43*a* under influence of the rods 403, and until the lock 82 is unlocked from the key 72, is made independently of the bolt 41 by reason of slot 64 (Fig. 9) being longer than the width of the key 62 passing therethrough. Combined movement of the slides 43, 43*a*, and bolt 41 to the rear is through the medium of key 62.

Movement of the bolt 41 to extreme rearward position is effected by recoil and blowback action, the gases of explosion ejecting the spent case against the front face of the bolt. Resistance of the driving spring 47 is overcome by blowback, and residual force over that necessary to move the bolt to the rear is expended in the buffer spring 123, the rear face 126 of the bolt striking the washer 124 (Fig. 7).

When the round is chambered by the bolt 41, the extractor 101 carried thereby is brought into engagement with the base of the cartridge, the chamfered front end of the claw 103 camming over the base thereof and then entering the extractor groove 585, such engagement of the extractor being effected and maintained by the resilient rod 106 (Fig. 6*b*). Accordingly, when the bolt is returned and the gases of explosion have dissipated, the extractor is relied upon to withdraw the case from the breech until the base thereof strikes the claws 134 (Fig. 10). Such action pivots the case downwardly about the extractor to disengage the same therefrom, and further movement of the bolt rearwardly thrusts the case downwardly through the open bottom of the receiver and aperture 9 in the cradle (Fig. 21).

In order that the rearward motion of the bolt 41 may not be interfered with, the ejecting action of the claws 134 is cushioned by means of springs 136, these yielding slightly to permit the claws to swing about the pivot 133 during the instant while ejection occurs, the bolt being in motion.

After ejection of the empty casing as aforesaid and the return of the bolt, the next round is delivered to the receiver, this part of the cycle being described forthwith. It will be comprehended that due to the rapid rate of fire, the next round is starting into the receiver while the preceding empty case is being ejected. However, the timing is such as to insure against the possibility of the entering round and the ejected case interfering with each other.

Referring now to Figs. 3*a* and 4, the gases of explosion will, in addition to performing the function of unlocking the breechblock slides and bolt, enter the apertures 448 and 500 to actuate the piston 508 forwardly, it being noted that in Fig. 3*a* said piston is shown in actuated position, the spring 510 (Fig. 5*a*) normally urging the piston to the rear. Prior to movement of the piston 508 to the front, the slide 663 (Fig. 5*b*) is to the left, having completed the prior feeding stroke. Accordingly, upon such actuation of the piston, the slide is reciprocated to the right against pressure of the spring 510 to enable the feeding pawls 701 and 702 to engage the next succeeding link 564*d* (Fig. 12). By this time the projectile has left the muzzle and the empty case has been extracted from the breech so that the gas pressure in the barrel, gas port, and passages in communication therewith has been relieved. Hence the spring 510 may become effective to return the piston rod 495 and the parts associated therewith to the position indicated in the several figures, the slide 663 in particular being therefore reciprocated to the left to feed round 700*d* into vertical alignment with the mouth 752, which round forces round 700*c* downwardly. During automatic fire the speed is such that the round is forced away from the pawls 755 and 756 while the bolt 41 is returning to the rear. Thus the dislodged round is deposited on top of the bolt 41. When the bolt is in its extreme rearward position, the round will drop off the bolt and into the bottom of the mouth 752 in readiness to be chambered upon reverse movement of the bolt as aforesaid. Thus as the bolt goes forward under urging of the driving spring 47, round 700*c* is chambered. Automatic firing continues in accordance with the cycle just detailed and for as long as solenoid 241 remains energized.

Passage of the gases of explosion to the cylinder 513 and their actuation of the piston 508 will load the spring 510, whereupon dissipation of the pressure of such gases, occurring when the projectile leaves the gun barrel, will allow the spring 510 to restore to its normal length, and by so doing operate the feeding mechanism. Thus, some variation in gas pressure, as is usual, will not adversely influence operation of the feeder, as might be the case if such pressure were directly effective to actuate the feeder. By utilizing the expansive force of the spring 510 in restoring itself to normal, more uniform operation of the feeder is obtained. Moreover, by using the cushioned effect of the expanding spring to actuate the feeder, there is no likelihood of damaging the feeder in the event of a jam therein. Positive operation of the feeder directly by the gases of explosion might, if such pressure were unduly excessive, damage the parts of the feeder.

When the last round of a belt is delivered into position above the pawls 755 and 756, a succeeding operation of the slide 663 is, because of the absence of an additional round, unable to position a round above the round held on the pawls to thrust the same down to the mouth. If the pawls 755 and 756 were not provided, such last round would fall by gravity, or, in the case of an aircraft-mounted gun, may be urged by centrifugal force into the mouth. Because of the rapid rate of fire, it is not feasible to depend upon gravity or some unpredictable force for delivery of the rounds to the mouth, as such delivery would be too indefinite in phase and positioning to synchronize with the definitely timed, remaining steps of the cycle, and misfiring and jamming would be all too likely to occur. Accordingly, the last round holding pawls 755 and 756 are provided to insure that each round is held out of the mouth until forced thereinto by a succeeding round fed thereagainst by a properly timed part of the cycle, and with a properly proportioned force.

Automatic fire is terminated by interrupting the circuit including the solenoid 241, whereupon the spring 272 may urge the trigger 276 inwardly into the path of the left-hand breechblock slide 43a. Upon the next forward movement of the slide, it abuts the trigger to prevent the slide from assuming its foremost position. Such action, in turn, through the medium of the key 62, restrains the firing pin 46 from moving to firing position, and the cycle is terminated, a round still lodged in the breech. Consequently resumption of fire finds a chambered round ready for firing, and the delay incident to chambering a round before fire can commence is obviated. It is to be noted that the gun of this invention fires from a closed bolt position as contrasted with prior similar guns which fire from an open bolt position. Accordingly the additional time consumed in moving the bolt to obturation is avoided by the instant invention.

In the event of a dud an automatic gun will cease firing. Accordingly it becomes necessary to extract the dud from the chamber and to recharge the gun. Prior types of automatic guns were equipped with spring-operated chargers, the initial storing of force in the spring being relied upon not only for charging but for recharging, so that when a succession of duds was encountered the spring quickly became exhausted and re-loading was necessary. In the case of guns inaccessible to the operator during combat, for example, in aircraft, a spring-powered charger once run down was out of service, the initial charging having been performed on the ground. However, with the pneumatic charger of my invention re-charging is easily accomplished through the medium of a valve in the cockpit, and in the manner already detailed.

In the event the gun is so mounted as to render the pawl release button 718 (Fig. 30) and the pawl handle 737 (Fig. 12) inaccessible, it is within the contemplation of my invention to attach suitable means thereto for remote control, e. g., a Bowden wire or the like.

While I have shown and described particular embodiments of my invention, it will be understood, of course, that I do not wish to be limited thereto since modifications may be made, and I therefore contemplate by the appended claims to cover any such modifications as fall within the true spirit and scope of my invention.

Having thus described my invention, what I claim and desire to secure by Letters Patent is:

1. In an automatic gun including a receiver, a breechblock slide and, a bolt, having a driving spring, the combination comprising a charging cylinder adjacent the receiver, a piston within said cylinder and adapted to engage a portion of the breechblock slide to charge the gun, a spring for returning said piston to a position ready for a succeeding charging operation, means for admitting compressed air to said cylinder including a timing valve and a quick-release valve, said quick-release valve having a short exhaust path to atmosphere, both said valves being intermediate the source of air and the cylinder, whereby air admitted to said charging cylinder through said timing valve and quick-release valve will retract the breechblock slide and bolt to open-bolt position, and means interconnecting said charging cylinder and quick-release valve to permit release of pressure from said charging cylinder through said quick-release valve to atmosphere and allow rapid return of the bolt to closed-bolt position under bias of the driving spring.

2. In an automatic gun having a receiver and a bolt and breechblock slides therein, the combination comprising a pneumatically-operated cartridge feeding device, a pneumatically operated bolt retracting mechanism, a valve for controlling said bolt retracting mechanism at a predetermined part of a complete firing cycle of the gun, an operative connection between said valve and said device for controlling the position of said valve during retraction of the bolt and feeding of a cartridge to the receiver, and a freely-movable piston associated with said feeding device and operable by and upon a predetermined air pressure for conditioning said device for feeding a cartridge to the receiver.

3. In an automatic gun having a receiver, a bolt, a bolt-driving spring and a cartridge feeding mechanism, the combination comprising a cylinder adjacent the receiver, a piston slidable within said cylinder and in operative relation with the bolt, first valve means controllable from a point remotely of the gun for admitting compressed air to said cylinder to charge the gun, and second valve means for permitting said charging means to release the bolt to closed bolt position, said second valve means having a port adjacent the gun and exhausting through a minimum path to atmosphere, and mechanical means interconnecting the feeding mechanism and said first valve means and controlling said first valve means to maintain the bolt in retracted position until such time as the feeding mechanism has delivered a cartridge before the bolt.

4. In an automatic gun having a receiver, a bolt and breechblock slides carried by the receiver, and a cartridge-feeding mechanism, the combination comprising a charging cylinder adjacent the receiver, a charging piston within said cylinder and adapted to engage a portion of one of the breechblock slides, a second cylinder and a feeder-operating piston therein movable in one direction and operatively connected to the feeding mechanism to feed a cartridge to the receiver, a spring for restoring said feeding mechanism to normal, a timing valve including a member under the control of said feeder-operating piston, a source of compressed air, conduits interconnecting said source to said valve and said second cylinder, and a conduit interconnecting said valve to said charging cylinder, whereby admission of air to said valve will open the same to operate said charging piston and will substantially simultaneously operate said feeder-operating piston.

5. In an automatic gun having a cartridge feeding mechanism, a receiver and a bolt therein, the combination comprising pneumatically-operated gun-charging means, a valve for admitting air to said gun-charging means to move the bolt to open-bolt position, second pneumatic means for actuating the cartridge feeding mechanism, and an operative connection between said valve and said second pneumatic means for maintaining the bolt in open-bolt position during the feeding of a round by the feeder into the receiver.

6. In an automatic gun having a cartridge feeding mechanism, a receiver and a bolt therein, the combination comprising pneumatically-operated gun-charging means, a valve for admitting air to said gun-charging means and adapted to be opened by air pressure thereagainst and to be closed by a spring forming part thereof, and said valve having a member for mechanically opening said valve, said valve receiving compressed air from a source thereof for passage therethrough to said gun-charging means to retract the bolt to open-bolt position, a spring for operating said cartridge-feeding mechanism, second pneumatic means for energizing said spring including a cylinder, a plunger slidable therein and a connecting rod between said plunger and the cartridge-feeding mechanism, a piston within said cylinder and mounted for free sliding movement with respect to said rod, said valve member being also actuable by said sliding piston in certain positions of said piston, a spring for urging said piston to a position whereby said valve is held in open position, a conduit for passage of air to said valve from said source, said conduit also being in communication with one face of said freely sliding piston, to energize said second-mentioned spring substantially simultaneously with the retraction of the bolt to open-bolt position.

7. In an automatic gun having a bolt, breechblock slides, a cartridge feeder and a receiver, the combination comprising means for operating the feeder, a charging cylinder, a pneumatically-actuated charging piston slidable within said cylinder and adapted to engage at least one of the slides to retract the bolt for charging, a first valve for controlling flow of air to said piston, a second valve for exhausting air from said charging cylinder, and a conduit interconnecting said valves, a conduit for admitting air from a source of supply to said first valve, and mechanical means operatively interconnecting said feeder-operating means and said first valve, said mechanical means permitting operation of said first valve, only following the feeding of a round to the receiver, to initiate flow of air from said charging cylinder through said second valve to atmosphere, the path of release of said air being substantially less than the path of admittance of said air.

8. In an automatic gun including a cartridge feeding mechanism, and pneumatically-operated gun-charging means having a spring for actuating said means in a cartridge chambering operation; apparatus for operating said gun and for assuring the completion of an operation of said cartridge feeding mechanism prior to the release of pressure in said pneumatically-operated gun-charging means and the ensuing cartridge chambering operation thereof, said apparatus comprising a source of compressed air, a mechanically releasable check valve, a pressure operated valve, a first conduit connecting said valves, a second conduit connecting said pressure operated valve to said gun-charging means, a second check valve connecting said first and second conduits, said releasable check valve being effective to prevent the flow of air therethrough outwardly of said first conduit but being mechanically releasable to permit such outward flow of air, said pressure operated valve being held firmly seated by the air pressure within said first conduit when said air pressure is at least equal to the air pressure in said second conduit, said pressure operated valve being operable by air pressure in said second conduit substantially greater than the air pressure in said first conduit to become unseated and to release air from said second conduit to the atmosphere, said second check valve permitting the flow of air from said first conduit to said second conduit and preventing the flow of air therethrough in the reverse direction, conduit means connecting said source of compressed air to said first conduit for actuating said gun-charging means through said second check valve to energize said spring, and mechanical means associated with said feeding mechanism for mechanically releasing said releasable check valve upon completion of a cartridge feeding operation of said mechanism to release air from said first conduit and thereby to permit the air pressure in said second conduit to unseat said second valve and open said second conduit to the atmosphere, whereby said spring may actuate said gun-charging means to chamber a cartridge.

EARL C. BUNNELL.

REFERENCES CITED

The following references are of record in the file of this patent:

UNITED STATES PATENTS

| Number | Name | Date |
|---|---|---|
| 1,786,207 | Hudson | Dec. 23, 1930 |
| 2,071,020 | Boussel | Feb. 16, 1937 |
| 2,116,860 | Blaylock et al. | May 10, 1938 |
| 2,159,127 | Birkigt | May 23, 1939 |
| 2,199,872 | Birkigt | May 7, 1940 |
| 2,340,705 | Slate | Feb. 1, 1944 |
| 2,353,118 | Schirokauer | July 4, 1944 |
| 2,373,794 | Swebilius | Apr. 17, 1945 |
| 2,386,722 | Sefried | Oct. 9, 1945 |
| 2,413,104 | Goepfrich | Dec. 24, 1946 |
| 2,440,071 | Boshka et al. | Apr. 20, 1948 |
| 2,453,830 | Chadwick et al. | Nov. 16, 1948 |

FOREIGN PATENTS

| Number | Country | Date |
|---|---|---|
| 9,446 | Great Britain | of 1910 |
| 355,767 | Great Britain | Feb. 21, 1930 |